United States Patent
Inoue et al.

(10) Patent No.: US 11,949,101 B2
(45) Date of Patent: Apr. 2, 2024

(54) LITHIUM COMPOSITE METAL COMPOUND, POSITIVE ELECTRODE ACTIVE MATERIAL FOR LITHIUM SECONDARY BATTERY, POSITIVE ELECTRODE FOR LITHIUM SECONDARY BATTERY, LITHIUM SECONDARY BATTERY, AND METHOD FOR MANUFACTURING LITHIUM COMPOSITE METAL COMPOUND

(71) Applicants: SUMITOMO CHEMICAL COMPANY, LIMITED, Tokyo (JP); TANAKA CHEMICAL CORPORATION, Fukui (JP)

(72) Inventors: Masashi Inoue, Niihama (JP); Yusuke Maeda, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 815 days.

(21) Appl. No.: 17/042,695

(22) PCT Filed: Feb. 28, 2019

(86) PCT No.: PCT/JP2019/007837
§ 371 (c)(1),
(2) Date: Sep. 28, 2020

(87) PCT Pub. No.: WO2019/187953
PCT Pub. Date: Oct. 3, 2019

(65) Prior Publication Data
US 2021/0057746 A1 Feb. 25, 2021

(30) Foreign Application Priority Data

Mar. 30, 2018 (JP) .................................. 2018-067766

(51) Int. Cl.
H01M 4/525 (2010.01)
C01G 53/00 (2006.01)
(Continued)

(52) U.S. Cl.
CPC ............ *H01M 4/525* (2013.01); *C01G 53/42* (2013.01); *H01M 4/505* (2013.01);
(Continued)

(58) Field of Classification Search
None
See application file for complete search history.

(56) References Cited

U.S. PATENT DOCUMENTS 5,955,051 A 9/1999 Li et al.
2011/0281168 A1 11/2011 Watanabe et al.
(Continued)

FOREIGN PATENT DOCUMENTS

CN 102484250 A 5/2012
CN 102754253 A 10/2012
(Continued)

OTHER PUBLICATIONS

Huang et al. [Improved calculations of pore size for relatively large, irregular slit-shaped mesopore structure, Microporous and Mesoporous Materials 184 (2014) 112-121] (Year: 2014).*
(Continued)

*Primary Examiner* — Brian R Ohara
*Assistant Examiner* — Michelle T Leonard
(74) *Attorney, Agent, or Firm* — Rimon P.C.

(57) ABSTRACT

Provided are a lithium composite metal compound having excellent cycle characteristics in the case of being used as battery materials, a positive electrode active material for a lithium secondary battery using the same, a positive electrode using the same, and a lithium secondary battery using the same. The lithium composite metal compound is repre-
(Continued)

sented by Composition Formula (I), in which physical property values of pores that are obtained from measurement of nitrogen adsorption and desorption isotherms at a liquid nitrogen temperature satisfy requirements (1) and (2).

11 Claims, 6 Drawing Sheets

(51) Int. Cl.
  *H01M 4/02* (2006.01)
  *H01M 4/505* (2010.01)
  *H01M 10/0525* (2010.01)

(52) U.S. Cl.
  CPC ..... *H01M 10/0525* (2013.01); *C01P 2002/50* (2013.01); *C01P 2006/14* (2013.01); *C01P 2006/17* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2011/0305955 A1 | 12/2011 | Song et al. |
| 2012/0119167 A1 | 5/2012 | Matsumoto et al. |
| 2012/0292561 A1 | 11/2012 | Sasaoka et al. |
| 2013/0344387 A1 | 12/2013 | Endo et al. |
| 2014/0038053 A1 | 2/2014 | Endo et al. |
| 2014/0306151 A1 | 10/2014 | Endo et al. |
| 2015/0024207 A1 | 1/2015 | Kase et al. |
| 2015/0194673 A1 | 7/2015 | Takagi et al. |
| 2016/0133927 A1 | 5/2016 | Kamata et al. |
| 2016/0372749 A1 | 12/2016 | Iida et al. |
| 2017/0170478 A1 | 6/2017 | Mihara et al. |
| 2017/0294652 A1 | 10/2017 | Arimoto et al. |
| 2018/0145318 A1 | 5/2018 | Endo et al. |
| 2018/0159172 A1 | 6/2018 | O'Neill et al. |

FOREIGN PATENT DOCUMENTS

| | | |
|---|---|---|
| CN | 102074679 B | 4/2013 |
| CN | 103515585 A | 1/2014 |
| CN | 103579606 A | 2/2014 |
| CN | 103765639 A | 4/2014 |
| CN | 104137310 A | 11/2014 |
| CN | 105378987 A | 3/2016 |
| CN | 106537661 A | 3/2017 |
| CN | 107615529 A | 1/2018 |
| CN | 107615530 A | 1/2018 |
| JP | 2012-004109 A | 1/2012 |
| JP | 2015-041600 A | 3/2015 |
| JP | 2015-191848 A | 11/2015 |
| JP | 6113902 B1 | 4/2017 |
| JP | 6113902 B1 * | 4/2017 |
| JP | 2018-073654 A | 5/2018 |
| TW | 541745 B | 7/2003 |
| WO | 2010/064440 A1 | 6/2010 |
| WO | 2014/034430 A1 | 3/2014 |

OTHER PUBLICATIONS

Chinese Office Action issued in corresponding Chinese Patent Application No. 201980022958.1, dated Apr. 24, 2022, with English translation.

International Search Report issued in corresponding International Patent Application No. PCT/JP2019/007837, dated Apr. 16, 2019, with English translation.

Notice of Reasons for Refusal issued in corresponding Japanese Patent Application No. 2018-067766, dated Oct. 30, 2018, with English translation.

Extended European Search Report issued in corresponding European Patent Application No. 19775658.8-1108, dated Dec. 15, 2021.

* cited by examiner

LITHIUM COMPOSITE METAL COMPOUND, POSITIVE ELECTRODE ACTIVE MATERIAL FOR LITHIUM SECONDARY BATTERY, POSITIVE ELECTRODE FOR LITHIUM SECONDARY BATTERY, LITHIUM SECONDARY BATTERY, AND METHOD FOR MANUFACTURING LITHIUM COMPOSITE METAL COMPOUND

CROSS REFERENCE TO RELATED APPLICATIONS

This application is the U.S. National Phase under 35 U.S.C. § 371 of International Application No. PCT/JP2019/007837, filed on Feb. 28, 2019, which claims the benefit of Japanese Application No. 2018-067766, filed on Mar. 30, 2018, the entire contents of each are hereby incorporated by reference.

TECHNICAL FIELD

The present invention relates to a lithium composite metal compound, a positive electrode active material for a lithium secondary battery, a positive electrode for a lithium secondary battery, a lithium secondary battery, and a method for manufacturing a lithium composite metal compound.

BACKGROUND ART

Lithium metal composite oxides are used as positive electrode active materials for lithium secondary batteries (hereinafter, referred to as "positive electrode active material" in some cases). Attempts of putting lithium secondary batteries into practical use not only for small-sized power sources in mobile phone applications, notebook personal computer applications, and the like but also for medium-sized and large-sized power sources in automotive applications, power storage applications, and the like have already been underway.

In order to improve diverse battery performance, positive electrode active materials in which fine pores are formed are manufactured. For example, Patent Literature 1 describes an invention relating to a manufacturing method having a step of removing a residue that blocks fine pores by washing.

CITATION LIST

Patent Literature

[Patent Literature 1]
Japanese Patent No. 6113902

SUMMARY OF INVENTION

Technical Problem

In order to further improve the performance of lithium secondary batteries, the method described in Patent Literature 1 has room for an additional improvement.

The present invention has been made in view of the above-described circumstances, and an object of the present invention is to provide a lithium composite metal compound being excellent in terms of the initial charge and discharge efficiency and the cycle characteristics in the case of being used as battery materials, a positive electrode active material for a lithium secondary battery using the same, a positive electrode using the same, and a lithium secondary battery using the same.

Solution to Problem

That is, the present invention includes the inventions of the following [1] to [11].

[1] A lithium composite metal compound represented by Composition Formula (I), in which physical property values of pores that are obtained from measurement of nitrogen adsorption and desorption isotherms at a liquid nitrogen temperature satisfy requirements (1) and (2),

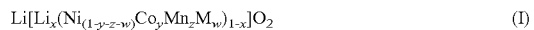

$$Li[Li_x(Ni_{(1-y-z-w)}Co_yMn_zM_w)_{1-x}]O_2 \qquad (I)$$

(M represents one or more elements selected from the group consisting of Mn, Fe, Cu, Ti, Mg, Al, W, B, Mo, Zn, Sn, Zr, Ga, Nb, and V, and $-0.10 \leq x \leq 0.2$, $0 < y \leq 0.2$, $0 \leq z \leq 0.2$, and $0 < y+z \leq 0.25$ are satisfied), (1) a total pore volume determined from an amount of nitrogen adsorbed when a relative pressure ($p/p_0$) of an adsorption isotherm is 0.99 is 0.008 cm$^3$/g or more and 0.012 cm$^3$/g or less, and (2) in a pore distribution determined from a desorption isotherm by a BJH method, a proportion of a volume of pores of 15 nm or less with respect to a total pore volume of 200 nm or less is less than 50%.

[2] The lithium composite metal compound according to [1], in which a content of lithium carbonate is 0.3 mass % or less, and a content of lithium hydroxide is 0.2 mass % or less.

[3] The lithium composite metal compound according to [1] or [2], in which, in the pore distribution determined from the adsorption isotherm by the BJH method, a minimum value of pore diameters at which a peak of a log differential pore volume is observed is 10 nm or more.

[4] The lithium composite metal compound according to any one of [1] to [3], in which, in a hysteresis loop of the adsorption isotherm and the desorption isotherm that are obtained from the measurement of the nitrogen adsorption and desorption isotherms, in a case where an area between the adsorption isotherm and the desorption isotherm at the relative pressures ($p/p_0$) in a range of 0.7 or more and 0.9 or less is denoted by S1, and an area between the adsorption isotherm and the desorption isotherm at the relative pressures ($p/p_0$) in a range of 0.5 or more and 0.9 or less is denoted by S2, the ratio (S1/S2) of the S1 to the S2 is 0.8 or more.

[5] The lithium composite metal compound according to any one of [1] to [4], in which, in the pore distribution determined from the desorption isotherm by the BJH method, a peak of a log differential pore volume is present at a pore diameter in a range of 10 nm or more and 40 nm or less.

[6] The lithium composite metal compound according to any one of [1] to [5], in which, in the pore distribution determined from the desorption isotherm by the BJH method, a peak value of a log differential pore volume at a pore diameter in a range of 3 nm or more and 5 nm or less is less than 0.005 cm$^3$/(g·nm).

[7] The lithium composite metal compound according to any one of [1] to [6], in which, in the pore distribution determined from the desorption isotherm by the BJH method, a peak value of a log differential pore volume is not present at a pore diameter in a range of 3 nm or more and 5 nm or less.

[8] A positive electrode active material for a lithium secondary battery, including: the lithium composite metal compound according to any one of [1] to [7].

[9] A positive electrode for a lithium secondary battery, including: the positive electrode active material for a lithium secondary battery according to [8].

[10] A lithium secondary battery including: the positive electrode for a lithium secondary battery according to [9].

[11] A method for manufacturing a lithium composite metal compound represented by Composition Formula (I), the method having a step of calcining a mixture of a lithium compound and a transition metal compound to obtain a lithium composite metal compound, a water washing step of removing the lithium compound remaining in the lithium composite metal compound by water washing, and a step of drying the water-washed lithium composite metal compound, in which the drying step is performed in a rotary kiln supplied with a gas having a carbon dioxide concentration of 300 ppm or less, the water-washed lithium composite metal compound is heated at a temperature of 150° C. or higher and 300° C. or lower in the rotary kiln, and a ratio (B/A) of an aeration rate B ($Nm^3$/hour) of a gas that is supplied from an outside to a moisture evaporation rate A (kg/hour) during drying is 2 $Nm^3$/kg or more and 20 $Nm^3$/kg or less.

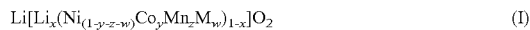

$$Li[Li_x(Ni_{(1-y-z-w)}Co_yMn_zM_w)_{1-x}]O_2 \quad (I)$$

(M represents one or more elements selected from the group consisting of Mn, Fe, Cu, Ti, Mg, Al, W, B, Mo, Zn, Sn, Zr, Ga, Nb, and V, and $0.10 \le x \le 0.2$, $0 < y \le 0.2$, $0 \le z \le 0.2$, and $0 < y+z \le 0.25$ are satisfied.)

Advantageous Effects of Invention

According to the present invention, it is possible to provide a lithium composite metal compound being excellent in terms of the initial charge and discharge efficiency and the cycle characteristics in the case of being used as battery materials, a positive electrode active material for a lithium secondary battery using the same, a positive electrode using the same, and a lithium secondary battery using the same.

DESCRIPTION OF EMBODIMENTS

<Lithium Composite Metal Compound>

Figure 1A:
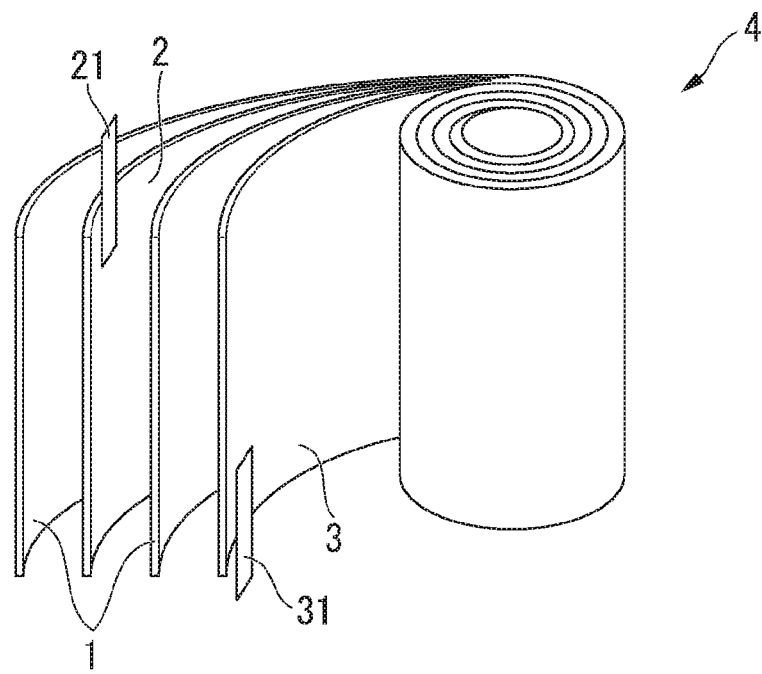
FIG. 1A is a schematic configuration view illustrating an example of a lithium-ion secondary battery.

The present embodiment is a lithium composite metal compound represented by Composition Formula (I), in which the physical property values of pores that are obtained from the measurement of nitrogen adsorption and desorption isotherms at a liquid nitrogen temperature satisfy requirements (1) and (2).

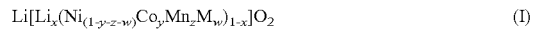

$$Li[Li_x(Ni_{(1-y-z-w)}Co_yMn_zM_w)_{1-x}]O_2 \quad (I)$$

(M represents one or more elements selected from the group consisting of Mn, Fe, Cu, Ti, Mg, Al, W, B, Mo, Zn, Sn, Zr, Ga, Nb, and V, and $-0.10 \le x \le 0.2$, $0 < y \le 0.2$, $0 \le z \le 0.2$, and $0 < y+z \le 0.25$ are satisfied.)

(1) The total pore volume determined from the amount of nitrogen adsorbed when the relative pressure ($p/p_0$) of the adsorption isotherm is 0.99 is 0.008 $cm^3$/g or more and 0.012 $cm^3$/g or less.

(2) In the pore distribution determined from the desorption isotherm by the BJH method, the proportion of the volume of pores of 15 nm or less with respect to the cumulative pore volume of all pores of 200 nm or less is less than 50%.

From the viewpoint of obtaining a lithium secondary battery having high cycle characteristics, x in Formula (I) is preferably −0.1 or more, more preferably −0.05 or more, and even more preferably 0 or more. In addition, from the viewpoint of obtaining a lithium secondary battery having a higher initial charge and discharge efficiency, x in Formula (I) is preferably 0.2 or less, more preferably 0.08 or less, and even more preferably 0.06 or less.

The upper limit and the lower limit of x can be a random combination.

For example, x is preferably −0.1 or more and 0.2 or less, more preferably −0.05 or more and 0.08 or less, and even more preferably 0 or more and 0.06 or less.

In the present specification, the expression "the cycle characteristics are high" means that the discharge capacity retention ratio is high.

In addition, from the viewpoint of obtaining a lithium secondary battery having high cycle characteristics, y in Formula (I) is preferably 0.005 or more, more preferably 0.05 or more, and even more preferably 0.1 or more. In addition, from the viewpoint of obtaining a lithium secondary battery having high thermal stability, y in Formula (I) is preferably 0.2 or less and more preferably 0.15 or less.

The upper limit and the lower limit of y can be a random combination.

For example, y is preferably 0.005 or more and 0.2 or less, more preferably 0.05 or more and 0.2 or less, and even more preferably 0.1 or more and 0.2 or less.

In addition, from the viewpoint of obtaining a lithium secondary battery having high cycle characteristics, z in Formula (I) is preferably 0.01 or more and more preferably 0.03 or more. In addition, from the viewpoint of obtaining a lithium secondary battery having high storage characteristics at high temperatures (for example, in an environment at 60° C.), z in Formula (I) is preferably 0.2 or less and more preferably 0.15 or less.

The upper limit and the lower limit of z can be a random combination.

For example, z is preferably 0.01 or more and 0.2 or less and more preferably 0.03 or more and 0.15 or less.

In addition, from the viewpoint of obtaining a lithium secondary battery having high cycle characteristics, M in Formula (I) is preferably one or more elements selected from the group consisting of Mn, Ti, Mg, Al, W, B, and Zr and is more preferably one or more elements selected from the group consisting of Mn, Al, W, B, and Zr.

Measurement of Nitrogen Adsorption and Desorption Isotherms at Liquid Nitrogen Temperature In the present embodiment, the pore distribution is measured by the nitrogen adsorption and desorption methods (the nitrogen adsorption method and the nitrogen desorption method) that are used for pore analysis.

Specifically, using an ordinary measurement instrument (BELSORP-mini or the like manufactured by MicrotracBeL Corp), nitrogen is gradually injected into the lithium composite metal compound from which a physically adsorbed component has been removed in advance from the starting state in a vacuum, and the amount of nitrogen adsorbed is calculated by the constant volume method from the change in the pressure of nitrogen attributed to adsorption, thereby obtaining the adsorption isotherm of nitrogen from 0 atm to 1 atm at the liquid nitrogen temperature. After reaching the atmospheric pressure, the pressure of nitrogen is gradually reduced, thereby obtaining the desorption isotherm from 1 atm to 0 atm.

[Requirement (1)]

In the lithium composite metal oxide of the present embodiment, the total pore volume determined from the amount of nitrogen adsorbed when the relative pressure ($p/p_0$) of the adsorption isotherm is 0.99 is 0.008 cm$^3$/g or more and 0.012 cm$^3$/g or less. The total pore volume is preferably 0.0081 cm$^3$/g or more and more preferably 0.0082 cm$^3$/g or more. In addition, the total pore volume is preferably 0.0115 cm$^3$/g or less and more preferably 0.011 cm$^3$/g or less.

The upper limit and the lower limit of the total pore volume can be a random combination. For example, the value of the total pore volume can be set to 0.008 cm$^3$/g or more and 0.012 cm$^3$/g or less and is preferably 0.0081 cm$^3$/g or more and 0.0115 cm$^3$/g or less and more preferably 0.0082 cm$^3$/g or more and 0.011 cm$^3$/g or less.

The state in which the relative pressure is 0.99, which is a state in which the relative pressure is close to 1, is a pressure near the saturated vapor pressure, and it is considered that nitrogen causes capillary condensation in pores and is present in an almost liquid-phase state. The total pore volume can be obtained by converting the amount of nitrogen that is assumed to be in a liquid-phase state into the volume of gas in the standard state.

[Requirement of (2)]

In the lithium composite metal compound of the present embodiment, in the pore distribution determined from the desorption isotherm by the Barrett-Joyner-Halenda (BJH) method, the proportion of the volume of pores of 15 nm or less with respect to the total pore volume of 200 nm or less is less than 50%, preferably 45% or less, and particularly preferably 40% or less. The BJH method is a method in which pores are assumed to have a cylindrical shape, and analysis is performed based on a relational expression (Kelvin equation) between the pore diameter at which capillary condensation occurs and the relative pressure of nitrogen. The pore diameter distribution determined from the desorption isotherm is derived from the pore diameters at the entrance (hereinafter, referred to as "neck diameter" in some cases) of bottleneck-type pores. On the other hand, the pore diameter distribution determined from the adsorption isotherm is derived from the pore diameters at the internal space of bottleneck-type pores.

The lithium composite metal compound that satisfies the requirement (1) and the requirement (2) is capable of improving the initial charge and discharge efficiency and the cycle characteristics of batteries.

Content of Lithium Carbonate

In the present embodiment, the content of lithium carbonate is preferably 0.3 mass % or less, more preferably 0.2 mass % or less, and particularly preferably 0.15 mass % or less.

Content of Lithium Hydroxide

In the present embodiment, the content of lithium hydroxide is preferably 0.2 mass % or less, more preferably 0.15 mass % or less, and particularly preferably 0.1 mass % or less.

The amount of lithium carbonate and the amount of lithium hydroxide can be obtained as values converted from the results of neutralization titration.

Log Differential Pore Volume Determined from Desorption Isotherm

In the present embodiment, the pore distribution determined from the desorption isotherm by the BJH method preferably has a peak of a log differential pore volume at a pore diameter in a range of 10 nm or more and 40 nm or less.

In the present embodiment, in the pore distribution determined from the desorption isotherm by the BJH method, the maximum peak of the log differential pore volumes at pore diameters in a range of 3 nm or more and 5 nm or less is preferably less than 0.04 cm$^3$/(g nm), more preferably less than 0.01 cm$^3$/(g·nm), even more preferably 0.005 cm$^3$/(g nm) or less, and particularly preferably less than 0.005 cm$^3$/(g-nm). The pore distribution particularly preferably has no peaks. In the present embodiment, when the value of the log differential pore volume is less than 0.001 cm$^3$/(g·nm), the pore distribution is defined to have no peaks.

The reason for the peak of the log differential pore volume being observed at a pore diameter in a region of 3 nm or more and 5 nm or less is that nitrogen confined in the bottleneck-type pores as capillary-condensed in the measurement of the desorption isotherm causes cavitation and abruptly vaporizes. That is, in a case where the peak of the log differential pore volume is present at the pore diameter in a region of 3 nm or more and 5 nm or less, it means that the lithium composite metal compound has a pore having a neck diameter smaller than 3 to 5 nm.

Log Differential Pore Volume Determined from Adsorption Isotherm

In the present embodiment, in the pore distribution determined from the adsorption isotherm by the BJH method, the minimum value of pore diameters at which the peaks of the log differential pore volumes are observed is preferably 10 nm or more.

In the present embodiment, the number of the peaks of the log differential pore volumes that are obtained from the adsorption isotherm is not limited to one, and the pore distribution may have a plurality of peaks. When the pore diameter at which the peak top is positioned is obtained for the peak at which the peak top value of the log differential pore volume is 0.005 cm³/(g nm) or more, the minimum pore diameter is preferably 10 nm or more and more preferably 20 nm or more. The upper limit of the minimum value of the pore diameters at which the peaks of the log differential pore volumes are observed is preferably 100 nm or less.

Areas S1 and S2 in Hysteresis Loop of Adsorption and Desorption Isotherms

The lithium composite metal compound of the present embodiment preferably satisfies the following conditions in the hysteresis loop of the nitrogen adsorption and desorption isotherms.

[Conditions]

The area between the adsorption isotherm and the desorption isotherm at relative pressures ($p/p_0$) in a range of 0.7 or more and 0.9 or less is denoted by S1. Specifically, the area of the desorption isotherm and the area of the adsorption isotherm are obtained by integration at relative pressures ($p/p_0$) in a range of 0.7 or more and 0.9 or less, and the area of the adsorption isotherm is subtracted from the area of the desorption isotherm, thereby obtaining the difference as the area S1.

The area between the adsorption isotherm and the desorption isotherm at relative pressures ($p/p_0$) in a range of 0.5 or more and 0.9 or less is denoted by S2. Specifically, the area of the desorption isotherm and the area of the adsorption isotherm are obtained by integration at relative pressures ($p/p_0$) in a range of 0.5 or more and 0.9 or less, and the area of the adsorption isotherm is subtracted from the area of the desorption isotherm, thereby obtaining the difference as the area S2.

At this time, the ratio (S1/S2) of the S1 to the S2 is 0.8 or more.

When the case of the lithium composite metal oxide having a number of fine pores of approximately several nanometers is taken into account, it can be considered that the desorption of adsorbed nitrogen is not easy in the desorption isotherm. As an example, the relationship between the relative pressure ($p/p_0$) and the corresponding pore diameter in the analysis of the pore distribution shows that the region where the relative pressure ($p/p_0$) is lower than 0.7 corresponds to the pore diameter that is smaller than approximately 7 nm. Therefore, as the number of pores having the pore diameters smaller than approximately 7 nm increases in the lithium composite metal oxide, the adsorption amount is less likely to decrease until a region where the relative pressure reached 0.5 to 0.7. At this time, the area S2 in which the relative pressures ($p/p_0$) are in a range of 0.5 or more and 0.9 or less becomes larger than S1, and the ratio (S1/S2) of S1 to S2 becomes smaller. In contrast, in a case where the ratio (S1/S2) of S1 to S2 is large, it is assumed that the lithium composite metal oxide has a small number of fine pores. S1/S2 is preferably 0.8 or more and more preferably 0.9 or more.

<Method for Manufacturing Lithium Composite Metal Compound>

The lithium composite metal compound of the present invention preferably includes a step of manufacturing a composite metal compound containing nickel, cobalt, and manganese and a step of manufacturing a lithium composite metal compound for which the composite metal compound and a lithium compound are used.

In the manufacturing of the lithium composite metal compound of the present invention, first, a composite metal compound containing an essential metal formed of metal other than lithium, that is, Ni or Co, and any one or more optional elements selected from the group consisting of Mn, Fe, Cu, Ti, Mg, Al, W, B, Mo, Nb, Zn, Sn, Zr, Ga, and V is prepared. After that, the composite metal compound is calcined together with an appropriate lithium compound.

As the composite metal compound, a composite metal hydroxide or a composite metal oxide is preferable.

Hereinafter, an example of a method for manufacturing the lithium composite metal compound will be described by separately describing a step of manufacturing the composite metal compound and a step of manufacturing the lithium composite metal compound.

(Step of Manufacturing Composite Metal Compound)

Generally, the composite metal compound can be manufactured by a well-known batch coprecipitation method or continuous coprecipitation method. Hereinafter, the manufacturing method will be described in detail using a composite metal hydroxide containing nickel, cobalt, and an optional metal M as metals as an example.

First, a nickel salt solution, a cobalt salt solution, a salt solution of the optional metal M, and a complexing agent are reacted together by a coprecipitation method, particularly, the continuous method described in Japanese Unexamined Patent Application, First Publication No. 2002-201028, thereby manufacturing a composite metal hydroxide of nickel, cobalt, and the optional metal M.

A nickel salt that is a solute of the nickel salt solution is not particularly limited, and, for example, any of nickel sulfate, nickel nitrate, nickel chloride, and nickel acetate can be used. As a cobalt salt that is a solute of the cobalt salt solution, for example, any of cobalt sulfate, cobalt nitrate, and cobalt chloride can be used. The above metal salts are used in proportions corresponding to the composition ratio of Formula (I). That is, the nickel salt, the cobalt salt, and the salt of the optional metal M are used in proportions of (1-y-z):y:z. In addition, as the solvent, water is used.

The complexing agent is capable of forming a complex with ions of nickel, cobalt, and the optional metal M in an aqueous solution, and examples thereof include ammonium ion donors (ammonium sulfate, ammonium chloride, ammonium carbonate, ammonium fluoride, and the like), hydrazine, ethylenediaminetetraacetic acid, nitrilotriacetic acid, uracildiacetic acid, and glycine. The complexing agent may not be contained, and, in a case where the complexing agent is contained, the amount of the complexing agent contained in the mixed solution containing the nickel salt solution, the cobalt salt solution, the optional metal M salt solution, and the complexing agent is, for example, more than 0 and 2.0 or less in terms of the molar ratio to the sum of the numbers of moles of the metal salts.

During the precipitation, an alkali metal hydroxide (for example, sodium hydroxide or potassium hydroxide) is added, if necessary, in order to adjust the pH value of the aqueous solution.

When the complexing agent in addition to the nickel salt solution, the cobalt salt solution, and the salt solution of the optional metal M is continuously supplied to a reaction tank, nickel, cobalt, and the optional metal M react together, whereby a composite metal hydroxide containing nickel, cobalt, and the optional metal M is manufactured.

During the reaction, the temperature of the reaction tank is controlled within a range of, for example, 20° C. or higher and 80° C. or lower and preferably 30° C. or higher and 70° C. or lower.

As the reaction tank, a type of reaction tank that causes the formed reaction precipitate to overflow for separation can be used.

When the concentrations, stirring speed, reaction temperature, and reaction pHs of the metal salts that are supplied to the reaction tank, calcining conditions, which will be described below, and the like are appropriately controlled, it is possible to control a positive electrode active material for a lithium secondary battery, which is to be finally obtained, to have desired physical properties.

After the above reaction, the obtained reaction precipitate is washed with water and then dried, and the composite hydroxide of nickel, cobalt, and the optional metal M is isolated as a composite compound of nickel, cobalt, and the optional metal M.

In addition, the reaction precipitate may be washed with a weak acid water or an alkaline solution containing sodium hydroxide or potassium hydroxide as necessary. In the above-described example, the nickel cobalt optional metal M composite hydroxide is manufactured, but a nickel cobalt optional metal M composite oxide may also be prepared. When a composite oxide of nickel, cobalt, and the optional metal M is adjusted from the composite hydroxide of nickel, cobalt, and the optional metal M, an oxidation step of performing oxidation through calcining at a temperature of 300° C. or higher and 800° C. or lower in a range of 1 hour or longer and 10 hours or shorter may be performed. In addition, classification may be appropriately performed after the step of drying or oxidizing the composite metal oxide or hydroxide.

(Step of Manufacturing Lithium Composite Metal Compound)

Mixing Step

After being dried, the composite metal oxide or hydroxide is mixed with a lithium compound.

As the lithium compound, any one of lithium carbonate, lithium nitrate, lithium acetate, lithium hydroxide, lithium hydroxide hydrate, and lithium oxide can be used or two or more thereof can be mixed together and used.

In the mixing step, the molar ratio (Li/Me) of lithium contained in the lithium compound to the metal element in the composite metal oxide or hydroxide is preferably more than 1, more preferably 1.03 or more, and particularly preferably 1.05 or more. The upper limit of the molar ratio of lithium to the metal element in the mixing step is, for example, 1.20 or less. When the molar ratio of lithium to the metal element is controlled in the above-described range, the sintering of lithium composite metal compound particles easily proceeds in a calcining step described below, and large voids are likely to be formed between primary particles. Therefore, it is possible to increase the pore volume of the lithium composite metal compound after the calcining step, and furthermore, it is also possible to increase the pore volume of the lithium composite metal compound after a washing step and a drying step.

The lithium compound and the composite metal hydroxide or the composite metal oxide are used in consideration of the composition ratio of the final object. For example, in a case where the composite hydroxide of nickel, cobalt, and the optional metal M is used, the lithium compound and the composite metal hydroxide are used in proportions corresponding to the composition ratio of Formula (I).

Calcining Step

The lithium composite metal compound is obtained by calcining the mixture of the nickel cobalt optional metal M composite metal oxide or hydroxide and the lithium compound. In the calcining, dry air, an oxygen atmosphere, an inert atmosphere, or the like is used depending on the desired composition, and a calcining step having a plurality of heating steps is performed as necessary.

The calcining temperature of the composite metal oxide or hydroxide and the lithium compound such as lithium hydroxide or lithium carbonate is not particularly limited, but is preferably 650° C. or higher and 900° C. or lower, more preferably 680° C. or higher and 850° C. or lower, and even more preferably 700° C. or higher and 800° C. or lower. Here, the calcining temperature is the highest temperature of the holding temperature in the calcining step (hereinafter, sometimes referred to as the highest holding temperature). In the case of the calcining step having a plurality of heating steps, the calcining temperature refers to the temperature of, among the respective heating steps, the heating step in which the mixture is heated at the highest holding temperature.

In the present embodiment, when the calcining temperature is set to the above-described lower limit or higher, the sintering of the lithium composite metal compound particles easily proceeds, and voids are likely to be formed between primary particles. Therefore, it is possible to increase the pore volume of the lithium composite metal compound after the calcining step, and furthermore, it is also possible to increase the pore volume of the lithium composite metal compound after the washing step and the drying step.

The total pore volume of the lithium composite metal compound after the calcining step is preferably 0.002 cm$^3$/g or more and more preferably 0.003 cm$^3$/g or more. The upper limit of the total pore volume of the lithium composite metal compound after the calcining step is preferably 0.008 cm$^3$/g or less and more preferably 0.007 cm$^3$/g or less.

The calcining time is preferably 3 hours or longer and 50 hours or shorter. When the calcining time exceeds 50 hours, there is a tendency that the battery performance becomes substantially poor due to the volatilization of lithium. That is, when the calcining time is 50 hours or shorter, it is possible to suppress the volatilization of lithium. When the calcining time is shorter than 3 hours, and there is a tendency that the development of crystals becomes poor and the battery performance becomes poor. When the calcining time is 3 hours or longer, and there is a tendency that the development of crystals becomes favorable and the battery performance becomes favorable.

Regarding the calcining time, the total time taken from the start of temperature rise to the end of temperature holding is preferably 1 hour or longer and 30 hours or shorter. When the total time is 30 hours or shorter, it is possible to prevent the volatilization of Li and to prevent the deterioration of the battery performance. When the total time is 1 hour or longer, the development of crystals favorably proceeds, and it is possible to improve the battery performance.

The time taken for the temperature to reach the calcining temperature from the start of temperature rise is preferably 0.5 hours or longer and 20 hours or shorter. When the time taken for the temperature to reach the calcining temperature from the start of temperature rise is in this range, it is possible to obtain a more uniform lithium composite metal oxide.

In the present embodiment, the temperature rising rate in the heating step in which the temperature reaches the highest holding temperature is preferably 180° C./hr or more, more preferably 200° C./hr or more, and particularly preferably 250° C./hr or more.

The temperature rising rate in the heating step in which the temperature reaches the highest holding temperature is calculated from the time taken from the time when the temperature rising is started to the time when the temperature reaches the holding temperature, which will be described below, in a calcining apparatus.

Washing Step

After calcining, the obtained lithium composite metal compound is washed by water washing. The washing step removes the lithium compound remaining in the lithium composite metal compound. As a washing solution, pure water can be used.

Examples of a method for bringing the washing solution and the lithium composite metal compound into contact with each other in the washing step include a method in which the lithium composite metal compound is injected into the washing solution and stirred or a method in which the washing solution is applied to the lithium composite metal compound as a shower solution.

When the powder of the lithium composite metal compound is washed with water, the lithium compound attached between primary particles is dissolved and eluted into the washing solution, and pores are formed in elution traces. In addition, the lithium composite metal compound is eroded by water, and the collapse of part of the lithium composite metal compound generates spaces between primary particles, which enables the generation of pores.

Drying Step

After the water washing step, a drying step of drying the lithium metal composite compound is performed.

The drying step is preferably performed in a rotary kiln supplied with a gas having a carbon dioxide concentration of 300 ppm or less. The carbon dioxide concentration in the gas is preferably 100 ppm or less and more preferably 10 ppm or less. When the carbon dioxide concentration exceeds 300 ppm, the amount of lithium carbonate contained in the lithium metal composite oxide increases, and there is a tendency that the battery performance becomes poor. The kind of the gas that is supplied is not particularly limited, and nitrogen or air can be used. In the drying step, the washed lithium metal composite oxide is heated at a temperature of 150° C. or higher and 300° C. or lower in the rotary kiln, and the drying step is performed under a condition in which the ratio (B/A) of the aeration rate B ($Nm^3$/hour) of a gas that is supplied from the outside to the moisture evaporation rate A (kg/hour) during drying is 2 $Nm^3$/kg or more and 20 $Nm^3$/kg or less. The range of the value of the B/A is preferably 2.5 $Nm^3$/kg or more and 15 $Nm^3$/kg or less and more preferably 3 $Nm^3$/kg or more and 10 $Nm^3$/kg or less.

In the present embodiment, since the water washing step is performed, it is assumed that the lithium metal composite compound is eroded by water and is in a state in which the lithium composite metal compound may easily collapse. Furthermore, the drying step is performed under specific conditions, whereby it is possible to control the state of the pores generated by the water washing step to be in the scope of the present embodiment. Specifically, the drying step is performed under the above-described specific conditions, whereby it is considered that the evaporation of moisture contained in the water-washed lithium metal composite compound rapidly proceeds. When the evaporation of moisture rapidly proceeds, the collapse of some of the secondary particles of the lithium metal composite compound is prevented, and the formation of the fine pores is suppressed. The fine pores are generated by the blocking of the inside of the pores generated by the water washing step due to the collapse of some of the secondary particles during the drying step.

<Lithium Secondary Battery>

Next, a positive electrode for which a positive electrode active material for a lithium secondary battery of the present invention is used as a positive electrode active material for a lithium secondary battery and a lithium secondary battery having the positive electrode will be described while describing the configuration of a lithium secondary battery.

An example of the lithium secondary battery of the present embodiment includes a positive electrode, a negative electrode, a separator interposed between the positive electrode and the negative electrode, and an electrolytic solution disposed between the positive electrode and the negative electrode.

Figure 1B:
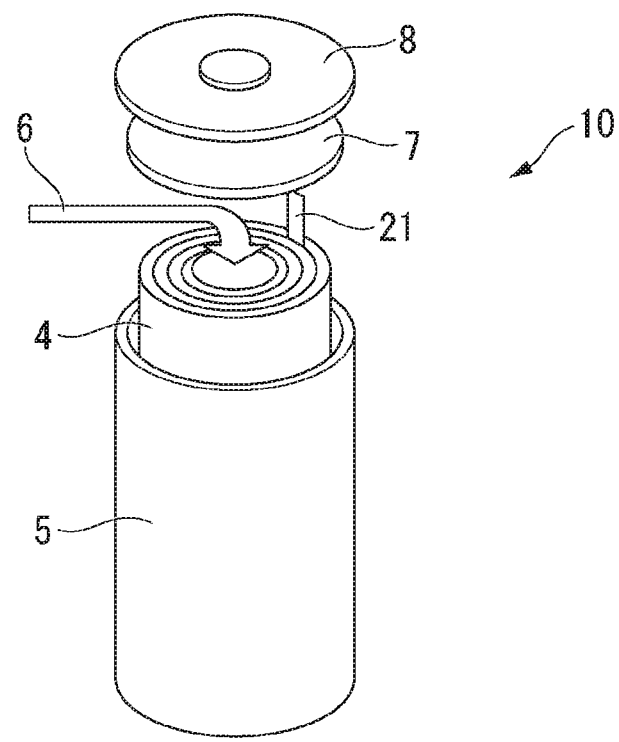
FIG. 1B is a schematic configuration view illustrating the example of the lithium-ion secondary battery.

FIG. 1A and FIG. 1B are schematic views illustrating an example of the lithium secondary battery of the present embodiment. A cylindrical lithium secondary battery 10 of the present embodiment is manufactured as follows.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in order of the separator 1, the positive electrode 2, the separator 1, and the negative electrode 3 and are wound to form an electrode group 4.

Next, as shown in FIG. 1B, the electrode group 4 and an insulator (not illustrated) are accommodated in a battery can 5, and then the can bottom is sealed. The electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be manufactured.

The shape of the electrode group 4 is, for example, a columnar shape such that the cross-sectional shape becomes a circle, an ellipse, a rectangle, or a rectangle with rounded corners when the electrode group 4 is cut in a direction perpendicular to the winding axis.

In addition, as the shape of a lithium secondary battery having the electrode group 4, a shape defined by IEC60086, which is a standard for batteries defined by the International Electrotechnical Commission (IEC), or by JIS C 8500 can be adopted. For example, shapes such as a cylindrical shape and a square shape can be adopted.

Furthermore, the lithium secondary battery is not limited to the wound type configuration and may have a stacked type configuration in which a stacked structure of a positive electrode, a separator, a negative electrode, and a separator is repeatedly stacked. The stacked type lithium secondary battery can be exemplified by a so-called coin type battery, a button type battery, and a paper type (or sheet type) battery.

Hereinafter, each configuration will be described in order.

(Positive Electrode)

A positive electrode of the present embodiment can be manufactured by first adjusting a positive electrode mixture containing a positive electrode active material, a conductive material, and a binder and causing a positive electrode current collector to hold the positive electrode mixture.

(Conductive Material)

A carbon material can be used as the conductive material included in the positive electrode of the present embodiment. As the carbon material, there are graphite powder, carbon black (for example, acetylene black), a fibrous carbon material, and the like. Since carbon black is fine particles and has a large surface area, the addition of a small amount of carbon black to the positive electrode mixture increases the conductivity inside the positive electrode and thus improves the charge and discharge efficiency and output characteristics. However, when the carbon black is added too much, both the binding force between the positive electrode mixture and the positive electrode current collector and the binding force inside the positive electrode mixture by the binder decrease, which causes an increase in internal resistance.

The proportion of the conductive material in the positive electrode mixture is preferably 5 parts by mass or more and 20 parts by mass or less with respect to 100 parts by mass of the positive electrode active material. In the case of using a fibrous carbon material such as graphitized carbon fiber or carbon nanotube as the conductive material, the proportions can be reduced.

(Binder)

A thermoplastic resin can be used as the binder included in the positive electrode of the present embodiment.

As the thermoplastic resin, fluorine resins such as polyvinylidene fluoride (hereinafter, sometimes indicated as PVdF), polytetrafluoroethylene (hereinafter, sometimes indicated as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene can be adopted.

These thermoplastic resins may be used as a mixture of two or more. By using a fluorine resin and a polyolefin resin as the binder and setting the ratio of the fluorine resin to the entire positive electrode mixture to 1 mass % or more and 10 mass % or less and the ratio of the polyolefin resin to 0.1 mass % or more and 2 mass % or less, a positive electrode mixture having both high adhesion to the positive electrode current collector and high bonding strength in the positive electrode mixture can be obtained.

(Positive Electrode Current Collector)

As the positive electrode current collector included in the positive electrode of the present embodiment, a strip-shaped member formed of a metal material such as Al, Ni, or stainless steel as the forming material can be used. Among these, from the viewpoint of easy processing and low cost, it is preferable to use Al as the forming material and process Al into a thin film.

As a method of causing the positive electrode current collector to hold the positive electrode mixture, a method of press-forming the positive electrode mixture on the positive electrode current collector can be adopted. In addition, the positive electrode mixture may be held by the positive electrode current collector by forming the positive electrode mixture into a paste using an organic solvent, applying the paste of the positive electrode mixture to at least one side of the positive electrode current collector, drying the paste, and pressing the paste to be fixed.

In the case of forming the positive electrode mixture into a paste, as the organic solvent which can be used, amine solvents such as N,N-dimethylaminopropylamine and diethylenetriamine; ether solvents such as tetrahydrofuran; ketone solvents such as methyl ethyl ketone; ester solvents such as methyl acetate; and amide solvents such as dimethylacetamide and N-methyl-2-pyrrolidone (hereinafter, sometimes indicated as NMP) can be adopted.

Examples of a method of applying the paste of the positive electrode mixture to the positive electrode current collector include a slit die coating method, a screen coating method, a curtain coating method, a knife coating method, a gravure coating method, and an electrostatic spraying method.

The positive electrode can be manufactured by the method described above.

(Negative Electrode)

The negative electrode included in the lithium secondary battery of the present embodiment may be capable of being doped with or dedoped from lithium ions at a potential lower than that of the positive electrode, and an electrode in which a negative electrode mixture containing a negative electrode active material is held by a negative electrode current collector, and an electrode formed of a negative electrode active material alone can be adopted.

(Negative Electrode Active Material)

As the negative electrode active material included in the negative electrode, materials that can be doped with or dedoped from lithium ions at a potential lower than that of the positive electrode, such as carbon materials, chalcogen compounds (oxides, sulfides, and the like), nitrides, metals, and alloys can be adopted.

As the carbon materials that can be used as the negative electrode active material, graphite such as natural graphite and artificial graphite, cokes, carbon black, pyrolytic carbons, carbon fibers, and an organic polymer compound calcined body can be adopted.

As the oxides that can be used as the negative electrode active material, oxides of silicon expressed by the formula $SiO_x$ (where, x is a positive real number) such as $SiO_2$ and SiO; oxides of titanium expressed by the formula $TiO_x$ (where x is a positive real number) such as $TiO_2$ and TiO; oxides of vanadium expressed by the formula $VO_x$ (where x is a positive real number) such as $V_2O_5$ and $VO_2$; oxides of iron expressed by the formula $FeO_x$ (where x is a positive real number) such as $Fe_3O_4$, $Fe_2O_3$, and FeO; oxides of tin expressed by the formula $SnO_x$ (where x is a positive real number) such as $SnO_2$ and SnO; oxides of tungsten expressed by a general formula $WO_x$ (where, x is a positive real number) such as $WO_3$ and $WO_2$; and composite metal oxides containing lithium and titanium or vanadium such as $Li_4Ti_5O_{12}$ and $LiVO_2$ can be adopted.

As the sulfides that can be used as the negative electrode active material, sulfides of titanium expressed by the formula $TiS_x$ (where, x is a positive real number) such as $Ti_2S_3$, $TiS_2$, and TiS; sulfides of vanadium expressed by the formula $VS_x$ (where x is a positive real number) such $V_3S_4$, $VS_2$, and VS; sulfides of iron expressed by the formula $FeS_x$ (where x is a positive real number) such as $Fe_3S_4$, $FeS_2$, and FeS; sulfides of molybdenum expressed by the formula $MoS_x$ (where x is a positive real number) such as $MO_2S_3$ and $MoS_2$; sulfides of tin expressed by the formula $SnS_x$ (where x is a positive real number) such as $SnS_2$ and SnS; sulfides of tungsten expressed by $WS_x$ (where x is a positive real number) such as $WS_2$; sulfides of antimony expressed by the formula $SbS_x$ (where x is a positive real number) such as $Sb_2S_3$; and sulfides of selenium expressed by the formula $SeS_x$ (where x is a positive real number) such as $Se_5S_3$, $SeS_2$, and SeS can be adopted.

As the nitrides that can be used as the negative electrode active material, lithium-containing nitrides such as $Li_3N$ and $Li_{3-x}A_xN$ (where A is either one or both of Ni and Co, and $0<x<3$ is satisfied) can be adopted.

These carbon materials, oxides, sulfides, and nitrides may be used singly or in combination of two or more. In addition, these carbon materials, oxides, sulfides, and nitrides may be either crystalline or amorphous.

Moreover, as the metals that can be used as the negative electrode active material, lithium metal, silicon metal, tin metal, and the like can be adopted.

As the alloys that can be used as the negative electrode active material, lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$ can be adopted.

These metals and alloys are mainly used alone as an electrode after being processed into, for example, a foil shape.

Among the above-described negative electrode active materials, the carbon material containing graphite such as natural graphite or artificial graphite as a main component is preferably used because the potential of the negative electrode hardly changes from the uncharged state to the fully-charged state during charging (the potential flatness is favorable), the average discharge potential is low, the capacity retention ratio during repeated charging and discharging is high (the cycle characteristics are favorable), and the like. The shape of the carbon material may be, for example, a flaky shape such as natural graphite, a spherical shape such as mesocarbon microbeads, a fibrous shape such as graphitized carbon fiber, or an aggregate of fine powder.

The negative electrode mixture described above may contain a binder as necessary. As the binder, a thermoplastic resin can be adopted, and specifically, PVdF, thermoplastic polyimide, carboxymethylcellulose, polyethylene, and polypropylene can be adopted.

(Negative Electrode Current Collector)

As the negative electrode current collector included in the negative electrode, a strip-shaped member formed of a metal material, such as Cu, Ni, and stainless steel, as the forming material can be adopted. Among these, it is preferable to use Cu as the forming material and process Cu into a thin film because Cu is less likely to form an alloy with lithium and can be easily processed.

As a method of causing the negative electrode current collector to hold the negative electrode mixture, similarly to the case of the positive electrode, a method using press-forming, or a method of forming the negative electrode mixture into a paste using a solvent or the like, applying the paste onto the negative electrode current collector, drying the paste, and pressing the paste to be compressed can be adopted.

(Separator)

As the separator included in the lithium secondary battery of the present embodiment, for example, a material having a form such as a porous film, non-woven fabric, or woven fabric made of a material such as a polyolefin resin such as polyethylene and polypropylene, a fluorine resin, and a nitrogen-containing aromatic polymer can be used. In addition, two or more of these materials may be used to form the separator, or these materials may be stacked to form the separator.

In the present embodiment, the air resistance of the separator according to the Gurley method defined by JIS P 8117 is preferably 50 sec/100 cc or more and 300 sec/100 cc or less, and more preferably 50 sec/100 cc or more and 200 sec/100 cc or less in order for the electrolyte to favorably permeate therethrough during battery use (during charging and discharging).

In addition, the porosity of the separator is preferably 30 vol % or more and 80 vol % or less, and more preferably 40 vol % or more and 70 vol % or less. The separator may be a laminate of separators having different porosities.

(Electrolytic Solution)

The electrolytic solution included in the lithium secondary battery of the present embodiment contains an electrolyte and an organic solvent.

As the electrolyte contained in the electrolytic solution, lithium salts such as $LiClO_4$, $LiPF_6$, $LiAsF_6$, $LiSbF_6$, $LiBF_4$, $LiCF_3SO_3$, $LiN(S_2CF_3)_2$, $LiN(SO_2C_2F)_2$, $LiN(SO_2CF_3)(COCF_3)$, $Li(C_4F_9SO_3)$, $LiC(SO_2CF_3)_3$, $Li_2B_{10}Cl_{10}$, LiBOB (here, BOB refers to bis(oxalato)borate), LiFSI (here, FSI refers to bis(fluorosulfonyl)imide), lower aliphatic carboxylic acid lithium salts, and $LiAlCl_4$ can be adopted, and a mixture of two or more of these may be used. Among these, as the electrolyte, it is preferable to use at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$, which contain fluorine.

As the organic solvent included in the electrolytic solution, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; and sulfur-containing compounds such as sulfolane, dimethyl sulfoxide, and 1,3-propanesultone, or those obtained by introducing a fluoro group into these organic solvents (those in which one or more of the hydrogen atoms of the organic solvent are substituted with a fluorine atom) can be used.

As the organic solvent, it is preferable to use a mixture of two or more thereof. Among these, a mixed solvent containing a carbonate is preferable, and a mixed solvent of a cyclic carbonate and a non-cyclic carbonate and a mixed solvent of a cyclic carbonate and an ether are more preferable. As the mixed solvent of a cyclic carbonate and a non-cyclic carbonate, a mixed solvent containing ethylene carbonate, dimethyl carbonate, and ethyl methyl carbonate is preferable. An electrolytic solution using such a mixed solvent has many features such as a wide operating temperature range, being less likely to deteriorate even when charged and discharged at a high current rate, being less likely to deteriorate even during a long-term use, and being non-degradable even in a case where a graphite material such as natural graphite or artificial graphite is used as the negative electrode active material.

Furthermore, as the electrolytic solution, it is preferable to use an electrolytic solution containing a lithium salt containing fluorine such as $LiPF_6$ and an organic solvent having a fluorine substituent in order to enhance the safety of the obtained lithium secondary battery. A mixed solvent containing ethers having a fluorine substituent, such as pentafluoropropyl methyl ether and 2,2,3,3-tetrafluoropropyl difluoromethyl ether and dimethyl carbonate is even more preferable because the capacity retention ratio is high even when charging or discharging is performed at a high current rate.

A solid electrolyte may be used instead of the electrolytic solution. As the solid electrolyte, for example, an organic polymer electrolyte such as a polyethylene oxide-based polymer compound, or a polymer compound containing at least one or more of a polyorganosiloxane chain or a polyoxyalkylene chain can be used. A so-called gel type in which a non-aqueous electrolytic solution is held in a polymer compound can also be used. Inorganic solid electrolytes containing sulfides such as $Li_2S$—$SiS_2$, $Li_2S$—$GeS_2$, $Li_2S$—$P_2S_5$. $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ can be adopted, and a mixture or two or more thereof may be used. By using these solid electrolytes, the safety of the lithium secondary battery may be further enhanced.

In addition, in the case of using a solid electrolyte in the lithium secondary battery of the present embodiment, there may be cases where the solid electrolyte plays a role of the separator, and in such a case, the separator may not be required.

Since the positive electrode active material having the above-described configuration is manufactured using the lithium-containing composite metal oxide of the present embodiment described above, it is possible to improve the initial charge and discharge efficiency and the cycle characteristics of the lithium secondary battery for which the positive electrode active material is used.

In addition, since the positive electrode having the above-described configuration has the positive electrode active material for a lithium secondary battery of the present embodiment described above, it is possible to improve the initial charge and discharge efficiency and the cycle characteristics of the lithium secondary battery.

Furthermore, since the lithium secondary battery having the above-described configuration has the above-described positive electrode, the secondary battery has higher initial charge and discharge efficiency and higher cycle characteristics than in the related art.

EXAMPLES

Next, the present invention will be described in more detail with reference to examples.

<Compositional Analysis>

The compositional analysis of a lithium metal composite oxide powder that was manufactured by a method described below was performed using an inductively coupled plasma emission analyzer (SPS 3000, manufactured by SII Nano-Technology Inc.) after dissolving the powder of the obtained lithium metal composite oxide in hydrochloric acid.

<Measurement of Nitrogen Adsorption and Desorption Isotherms at Liquid Nitrogen Temperature>

The total pore volume of the lithium composite metal compound manufactured by the method described below, which was obtained from the amount of nitrogen adsorbed when the relative pressure ($p/p_0$) was 0.99, was obtained by the nitrogen desorption method and the nitrogen adsorption method.

A vacuum deaeration treatment was performed on 10 g of the lithium composite metal compound at 150° C. for 8 hours using a vacuum heating treatment apparatus (BEL-SORP-vacII manufactured by MicrotracBeL Corp). After the treatment, the desorption isotherm of nitrogen and the adsorption isotherm of nitrogen at the liquid nitrogen temperature (77 K) of the lithium composite metal compound were measured using a measurement instrument (BEL-SORP-mini manufactured by MicrotracBeL Corp). The amount of nitrogen adsorbed per unit weight of the lithium composite metal compound in the adsorption isotherm was calculated so as to be expressed by the volume of gaseous nitrogen in the standard state (STP; Standard Temperature and Pressure). The amount of nitrogen desorbed per unit weight of the lithium composite metal compound in the desorption isotherm was calculated so as to be expressed by the volume of gaseous nitrogen in the standard state (STP; Standard Temperature and Pressure).

The total pore volume was calculated from the following calculation expression by representing the amount of nitrogen adsorbed when the relative pressure of the adsorption isotherm ($p/p0=0.99$) as V cm$^3$ (STP)/g. In the following expression, the volume of 1 mol of gas in the standard state was set to 22414 cm$^3$, the molecular weight M of nitrogen was set to 28.013 g/mol, and the density ρ of nitrogen in the liquid-phase state was set to 0.808 g/cm$^3$.

Total pore volume(cm$^3$/g)=$V$/22414×$M$/ρ

The desorption isotherm was analyzed by the BJH method, and log differential pore volumes at individual pore diameters and a cumulative curve of the pore volumes with respect to the individual pore diameters were obtained in a region of a pore diameter of 200 nm or less. From the cumulative curve of the pore volumes, the proportion of the volume of pores of 15 nm or less with respect to the pore volume of all sections of 200 nm or less was obtained. Furthermore, the pore diameter having the peak of the log differential pore volume at the pore diameter in a range of 10 nm or more and 40 nm or less and the peak value of the log differential pore volume at the pore diameters in a range of 3 nm or more and 5 nm or less were obtained.

Next, the adsorption isotherm was analyzed by the BJH method, in a region of the pore diameter of 200 nm or less, pore diameters having the maximum peak at which the peak value of the log differential pore volume reached 0.005 cm$^3$/(g·nm) or more were extracted, and the minimum pore diameter of the above-described pore diameters was obtained.

In the hysteresis loop of the adsorption isotherm and the desorption isotherm that were obtained from the measurement of the nitrogen adsorption and desorption isotherms, the ratio (S1/S2) of S1 to S2, which are described below, was obtained.

S1: The area between the adsorption isotherm and the desorption isotherm at relative pressures ($p/p_0$) in a range of 0.7 or more and 0.9 or less S2: The area between the adsorption isotherm and the desorption isotherm at relative pressures ($p/p_0$) in a range of 0.5 or more and 0.9 or less <Measurement of Amount of Lithium Carbonate and Amount of Lithium Hydroxide>

20 g of the lithium composite metal compound and 100 g of pure water were put into a 100 ml beaker and stirred for 5 minutes. After stirring, the lithium composite metal compound was filtered, 0.1 mol/L hydrochloric acid was added dropwise to 60 g of the remaining filtrate, and the pH of the filtrate was measured with a pH meter. The amount of hydrochloric acid used for titration when the pH was 8.3±0.1 was denoted by A ml, the amount of hydrochloric acid used for titration when the pH was 4.5±0.1 was denoted by B ml, and the concentrations of lithium carbonate and lithium hydroxide that remained in a positive electrode active material for a lithium secondary battery were calculated from the following calculation expression. In the following expression, the molecular weights of lithium carbonate and lithium hydroxide were calculated with an assumption that the atomic weights of H, Li, C, and O were 1.000, 6.941, 12, and 16, respectively.

Lithium carbonate concentration (%)=0.1×($B$–$A$)/1000×73.882/(20×60/100)×100

Lithium hydroxide concentration (%)=0.1×(2$A$–$B$)/1000×23.941/(20×60/100)×100

<Production of Positive Electrode for Lithium Secondary Battery>

A paste-like positive electrode mixture was prepared by adding the lithium metal composite oxide obtained by the manufacturing method described below, a conductive material (acetylene black), and a binder (PVdF) to achieve a composition of the lithium composite metal compound: conductive material:binder=92:5:3 (mass ratio) and performing kneading thereon. During the preparation of the positive electrode mixture, N-methyl-2-pyrrolidone was used as an organic solvent.

The obtained positive electrode mixture was applied to a 40 μm-thick Al foil that was to serve as a current collector, dried at 60° C., and further dried in a vacuum at 150° C. for 8 hours to obtain a positive electrode for a lithium secondary battery. The electrode area of the positive electrode for a lithium secondary battery was set to 1.65 cm².

<Production of Lithium Secondary Battery (Coin Type Half Cell)>

The following operation was performed in a glove box under a dry air atmosphere.

The positive electrode produced in the section "Production of positive electrode for lithium secondary battery" was placed on the lower lid of a coin cell for a coin type battery R2032 (manufactured by Hohsen Corp.) with the aluminum foil surface facing downward, and a laminated film separator (a heat-resistant porous layer (thickness 16 μm) laminated on a polyethylene porous film) was placed on the positive electrode. 300 μL of an electrolytic solution was injected thereinto. The electrolytic solution used was prepared by dissolving $LiPF_6$ in a mixed solution of ethylene carbonate, dimethyl carbonate, and ethyl methyl carbonate in a volume ratio of 30:35:35 to a concentration of 1.0 mol/L.

Next, lithium metal was used as the negative electrode, and the negative electrode was placed on the upper side of the laminated film separator. The upper lid was closed through a gasket, and the components were caulked using a caulking machine, thereby producing a lithium secondary battery (coin type battery R2032; hereinafter, referred to as "coin type battery" in some cases).

<Initial Charge/discharge Test>

Using the half cell produced in the section <Production of Lithium Secondary Battery (Coin Type Half Cell)>, an initial charge/discharge test was performed under the following conditions.

<Conditions for Initial Charge/Discharge Test>

Test temperature: 25° C.

Charging maximum voltage: 4.3 V, charging time: 6 hours, charging current: 0.2 CA, constant current constant voltage charging Discharging minimum voltage: 2.5 V, discharging time: 5 hours, discharging current: 0.2 CA, constant current discharging <Cycle Test>

After the initial charge/discharge test, the service life was evaluated by 50 times of a cycle test performed under conditions described below, and the discharge capacity retention ratio after 50 times of the cycle test was calculated with the following expression. It should be noted that, as the discharge capacity retention ratio after 50 times of the cycle test increases, the high-voltage cycle characteristics are more favorable.

Discharge capacity retention ratio after 50 times of cycle test (%)=$50^{th}$ discharge capacity/1st discharge capacity×100

Hereinafter, the discharge capacity retention ratio after 50 times of the cycle test will be referred to as "cycle retention ratio" in some cases.

<Conditions for Cycle Test>Test Temperature: 25° C.

Charging maximum voltage: 4.3 V, charging current: 0.5 CA, constant current constant voltage charging, end at current value of 0.05 CA Discharging minimum voltage: 2.5 V, discharging current: 1.0 CA, constant current discharging Example 1

Manufacturing of Lithium Composite Metal Compound 1

[Step of Manufacturing Nickel Cobalt Aluminum Composite Hydroxide]

After water was poured into a reaction tank equipped with a stirrer and an overflow pipe, an aqueous solution of sodium hydroxide was added thereto, and the liquid temperature was maintained at 38° C.

An aqueous solution of nickel sulfate and an aqueous solution of cobalt sulfate were mixed such that the atomic ratio between nickel atoms and cobalt atoms reached 0.82: 0.15, whereby a mixed raw material solution was prepared.

Next, the mixed raw material solution, an aqueous solution of aluminum sulfate containing 7.2 mass % of aluminum, and an aqueous solution of ammonium sulfate as a complexing agent were continuously added to the reaction tank under stirring, and nitrogen gas was continuously aerated. The aqueous solution of aluminum sulfate was added at an adjusted flow rate such that the atomic ratio of nickel atoms, cobalt atoms, and aluminum atoms reached 0.82:0.15:0.03. An aqueous solution of sodium hydroxide was timely added dropwise such that the pH, which was measured at 40° C., of the solution in the reaction tank reached 11.7, and nickel cobalt aluminum composite hydroxide particles were obtained. The nickel cobalt aluminum composite hydroxide particles were washed with a sodium hydroxide solution, dehydrated and isolated with a filter press, and dried at 350° C., thereby obtaining a nickel cobalt aluminum composite hydroxide 1.

[Oxidation Step]

The nickel cobalt aluminum composite hydroxide 1 was calcined at 700° C. for 2 hours to obtain a nickel cobalt aluminum composite oxide 1.

[Mixing Step]

The nickel cobalt aluminum composite oxide 1 obtained as described above and lithium hydroxide powder were weighed such that Li/(Ni+Co+Al) reached 1.15 and mixed together.

[Calcining Step]

After that, the mixture obtained in the mixing step was calcined in an oxygen atmosphere at 720° C. for 10 hours to obtain a calcined product 1. As a result of the measurement of the calcined product 1 by the nitrogen adsorption and desorption methods, the total pore volume was 0.0041 cm³/g, and the proportion of the volume of pores of 15 nm or less was 35%.

[Washing Step]

Next, the obtained calcined product 1 was washed with pure water to obtain a wet cake 1. The washing step was performed by producing a slurry of the calcined product 1 and pure water at a weight ratio of 100 g to 223 g, and then stirring and dehydrating the obtained slurry for 10 minutes.

[Drying Step]

After that, the obtained wet cake 1 was added to the inside of the core tube that was heated to 250° C. of a rotary kiln 1, and the wet cake 1 was dried for 2 hours while being circulated. The inner diameter of the core tube of the rotary kiln 1 was approximately 190 mm, the length of the heated portion was approximately 1600 mm, and nitrogen gas having a carbon dioxide concentration of less than 10 ppm was aerated at a flow rate of 1.2 Nm³/hour in the core tube. After drying, the washed and dried powder 1 of the lithium composite metal compound (hereinafter, referred to as lithium composite metal compound 1) was obtained.

In the drying step of the lithium composite metal compound 1, the moisture evaporation rate of the wet cake 1 was 0.4 kg/hour, and the ratio between the flow rate of the nitrogen gas to the moisture evaporation rate was 3.0 Nm$^3$/kg.

Evaluation of Lithium Composite Metal Compound 1

Compositional analysis of the obtained lithium composite metal compound 1 was performed, the composition was matched to Composition Formula (I), and it was found that x=0.01, y=0.15, and z=0.03. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Example 2

Manufacturing of Lithium Composite Metal Compound 2

The washed and dried powder 2 of a lithium composite metal compound (hereinafter, referred to as lithium composite metal compound 2) was obtained by the same method as in Example 1 except that, in the drying step of Example 1, the flow rate of the nitrogen gas that was aerated in the rotary kiln 1 was set to 0.6 Nm$^3$/hour.

In the drying step of the lithium composite metal compound 2, the moisture evaporation rate of the wet cake 1 was 0.4 kg/hour, and the ratio between the flow rate of the nitrogen gas to the moisture evaporation rate was 1.5 Nm$^3$/kg.

Evaluation of Lithium Composite Metal Compound 2

Compositional analysis of the obtained lithium composite metal compound 2 was performed, the composition was matched to Composition Formula (I), and it was found that x=0.01, y=0.15, and z=0.03. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Example 3

Manufacturing of Lithium Composite Metal Compound 3

The same operations up to the washing step as in Example 1 were performed to obtain the wet cake 1, and then, in the drying step, a rotary kiln 2 in which the size of the core tube was different from those in Example 1 and Example 2 was used. The wet cake 1 was added to the inside of the core tube that was heated to 250° C. and dried for 2 hours. The inner diameter of the core tube of the rotary kiln 2 was approximately 300 mm, and, as the length of the heated portion, the diameter of the heated portion was approximately 1800 mm. Nitrogen gas having a carbon dioxide concentration of less than 10 ppm was aerated in the core tube, and the flow rate of the nitrogen gas was set to 5.1 Nm$^3$/hour. After drying, the washed and dried powder 3 of the lithium composite metal compound (hereinafter, referred to as lithium composite metal compound 3) was obtained.

In the drying step of the lithium composite metal compound 3, the moisture evaporation rate of the wet cake 1 was 0.8 kg/hour, and the ratio between the flow rate of the nitrogen gas to the moisture evaporation rate was 6.4 Nm$^3$/kg.

Evaluation of Lithium Composite Metal Compound 3

Compositional analysis of the obtained lithium composite metal compound 3 was performed, the composition was matched to Composition Formula (I), and it was found that x=0.01, y=0.15, and z=0.03. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Example 4

Manufacturing of Lithium Composite Metal Compound 4

The same operations up to the washing step as in Example 1 were performed to obtain the wet cake 1, and then the wet cake 1 was put into a batch-type dryer and dried in an atmosphere of 210° C. for 8 hours. The inside of the dryer was decompressed to 10 kPa with a connected decompression pump, at the same time, nitrogen gas having a carbon dioxide concentration of less than 10 ppm was introduced, and the atmosphere was controlled. After drying, the washed and dried powder 4 of a lithium composite metal compound (hereinafter, referred to as lithium composite metal compound 4) was obtained.

Evaluation of Lithium Composite Metal Compound 4

Compositional analysis of the obtained lithium composite metal compound 4 was performed, the composition was matched to Composition Formula (I), and it was found that x=0.01, y=0.15, and z=0.03. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Example 5

Manufacturing of Lithium Composite Metal Compound 5

The same operations up to the washing step as in Example 1 were performed to obtain the wet cake 1, and then the wet cake 1 was put into a batch-type dryer and dried in a vacuum for 8 hours under heating at 150° C. After drying, the washed and dried powder 5 of a lithium composite metal compound (hereinafter, referred to as lithium composite metal compound 5) was obtained.

Evaluation of Lithium Composite Metal Compound 5

Compositional analysis of the obtained lithium composite metal compound 5 was performed, the composition was matched to Composition Formula (I), and it was found that x=0.01, y=0.15, and z=0.03. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Example 6

Manufacturing of Lithium Composite Metal Compound 6

[Step of Manufacturing Nickel Cobalt Aluminum Composite Hydroxide]

After water was poured into a reaction tank equipped with a stirring device and an overflow pipe, an aqueous solution of sodium hydroxide was added thereto, and the liquid temperature was maintained at 45° C.

An aqueous solution of nickel sulfate and an aqueous solution of cobalt sulfate were mixed such that the atomic ratio between nickel atoms and cobalt atoms reached 0.88: 0.09, whereby a mixed raw material solution was prepared.

Next, the mixed raw material solution, an aqueous solution of aluminum sulfate containing 7.2 mass % of aluminum, and an aqueous solution of ammonium sulfate as a complexing agent were continuously added to the reaction tank under stirring, and nitrogen gas was continuously aerated. The aqueous solution of aluminum sulfate was added at an adjusted flow rate such that the atomic ratio of nickel atoms, cobalt atoms, and aluminum atoms reached 0.88:0.09:0.03. An aqueous solution of sodium hydroxide was timely added dropwise such that the pH, which was measured at 40° C., of the solution in the reaction tank reached 12.1, and nickel cobalt aluminum composite hydroxide particles were obtained. The nickel cobalt aluminum composite hydroxide particles were washed with a sodium hydroxide solution, dehydrated and isolated with a filter press, and dried at 365° C., thereby obtaining a nickel cobalt aluminum composite hydroxide 2.

[Oxidation Step]

The obtained nickel cobalt aluminum composite hydroxide 2 was calcined at 670° C. for 3 hours to obtain a nickel cobalt aluminum composite oxide 2.

[Mixing Step]

The nickel cobalt aluminum composite oxide 2 obtained as described above and lithium hydroxide powder were weighed such that Li/(Ni+Co+Al) reached 1.07 and mixed together.

[Calcining Step]

After that, the mixture obtained in the mixing step was calcined in an oxygen atmosphere at 720° C. for 6 hours to obtain a calcined product 2.

[Washing Step]

After that, the obtained calcined product 2 was washed with pure water to obtain a wet cake 2. The washing step was performed by producing a slurry of the calcined product 2 and pure water at a weight ratio of 100 g to 270 g, and then stirring and dehydrating the obtained slurry for 20 minutes.

[Drying Step]

After that, the obtained wet cake 2 was put into a batch-type dryer and dried in a vacuum for 8 hours under heating at 150° C. After drying, the washed and dried powder 6 of the lithium composite metal compound (hereinafter, referred to as lithium composite metal compound 6) was obtained.

Evaluation of Lithium Composite Metal Compound 6

Compositional analysis of the obtained lithium composite metal compound 6 was performed, the composition was matched to Composition Formula (I), and it was found that x=0.01, y=0.09, and z=0.03. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Example 7

Manufacturing of Lithium Composite Metal Compound 7

[Step of Manufacturing Nickel Cobalt Aluminum Composite Hydroxide]

After water was poured into a reaction tank equipped with a stirring device and an overflow pipe, an aqueous solution of sodium hydroxide was added thereto, and the liquid temperature was maintained at 58° C.

An aqueous solution of nickel sulfate and an aqueous solution of cobalt sulfate were mixed such that the atomic ratio between nickel atoms and cobalt atoms reached 0.80: 0.15, whereby a mixed raw material solution was prepared.

Next, this mixed raw material solution, an aqueous solution of aluminum sulfate containing 7.2 mass % of aluminum, and an aqueous solution of ammonium sulfate as a complexing agent were continuously added to the reaction tank under stirring, and nitrogen gas was continuously aerated. The aqueous solution of aluminum sulfate was added at an adjusted flow rate such that the atomic ratio of nickel atoms, cobalt atoms, and aluminum atoms reached 0.80:0.15:0.05. An aqueous solution of sodium hydroxide was timely added dropwise such that the pH, which was measured at 40° C., of the solution in the reaction tank reached 11.6, and nickel cobalt aluminum composite hydroxide particles were obtained. The nickel cobalt aluminum composite hydroxide particles were washed with a sodium hydroxide solution, dehydrated and isolated with a centrifugal separator, and dried at 105° C., thereby obtaining a nickel cobalt aluminum composite hydroxide 3.

[Oxidation Step]

The obtained nickel cobalt aluminum composite hydroxide 3 was calcined at 650° C. for 5 hours to obtain a nickel cobalt aluminum composite oxide 3.

[Mixing Step]

The nickel cobalt aluminum composite oxide 3 obtained as described above and lithium hydroxide powder were weighed such that Li/(Ni+Co+Al) reached 1.10 and mixed together.

[Calcining Step]

After that, the mixture obtained in the mixing step was calcined in an oxygen atmosphere at 740° C. for 6 hours to obtain a calcined product 3.

[Washing Step]

After that, the obtained calcined product 3 was washed with pure water to obtain a wet cake 3. The washing step was performed by producing a slurry of the calcined product 3 and pure water at a weight ratio of 100 g to 355 g, and then stirring and dehydrating the obtained slurry for 20 minutes.

[Drying Step]

The obtained wet cake 3 was put into a batch-type dryer and dried in a vacuum for 8 hours under heating at 150° C. After drying, the washed and dried powder 7 of the lithium composite metal compound (hereinafter, referred to as lithium composite metal compound 7) was obtained.

Evaluation of Lithium Composite Metal Compound 7

Compositional analysis of the obtained lithium composite metal compound 6 was performed, the composition was matched to Composition Formula (I), and it was found that x=0.00, y=0.15, and z=0.05. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Comparative Example 1

Manufacturing of Lithium Composite Metal Compound 8

The same treatments up to the calcining step as in Example 1 were performed to obtain the calcined product 1. The calcined product 1 was regarded as a lithium composite metal compound 8 without performing the washing step and the drying step.

Evaluation of Lithium Composite Metal Compound 8

Compositional analysis of the obtained lithium composite metal compound 8 was performed, the composition was matched to Composition Formula (I), and it was found that $x=0.07$, $y=0.15$, and $z=0.03$. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Comparative Example 2

Manufacturing of Lithium Composite Metal Compound 9
[First Washing Step]

The same operations up to the calcining step as in Example 1 were performed to obtain the calcined product 1, and then a first washing step was performed using an 8.7 mass % aqueous solution of lithium hydroxide. In the first washing step, a slurry of the calcined product 1 and the 8.7 mass % aqueous solution of lithium hydroxide was produced at a weight ratio of 100 g to 233 g, and then the obtained slurry was stirred and dehydrated for 10 minutes.

[Second Washing Step]

A second washing step was performed using the dehydrated slurry obtained in the first washing step to obtain a wet cake 4. The second washing step was performed by adding 1000 g of pure water to 100 g of the calcined product in the slurry obtained in the first step and then dehydrating the mixture.

[Drying Step]

The obtained wet cake 4 was put into a batch-type dryer and dried in a vacuum for 8 hours under heating at 150° C. After drying, the washed and dried powder 9 of a lithium composite metal compound (hereinafter, referred to as lithium composite metal compound 9) was obtained.

Evaluation of Lithium Composite Metal Compound 9

Compositional analysis of the obtained lithium composite metal compound 9 was performed, the composition was matched to Composition Formula (I), and it was found that $x=0.01$, $y=0.15$, and $z=0.03$. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Comparative Example 3

Evaluation of Lithium Composite Metal Compound 10
[Mixing Step]

After the same operations up to the oxide step as in Example 6 were performed to obtain the nickel cobalt aluminum composite oxide 2, the nickel cobalt aluminum composite oxide 2 and lithium hydroxide powder were weighed such that Li/(Ni+Co+Al) reached 1.05 and mixed together.

[Calcining Step]

After that, the mixture obtained in the mixing step was calcined in an oxygen atmosphere at 720° C. for 6 hours to obtain a calcined product 4.

[Washing Step]

After that, the obtained calcined product 4 was washed with pure water to obtain a wet cake 5. The washing step was performed by producing a slurry of the calcined product 4 and pure water at a weight ratio of 1000 g to 2448 g, and then stirring and dehydrating the obtained slurry for 20 minutes.

The obtained wet cake 5 was put into a batch-type dryer and dried in a vacuum for 8 hours under heating at 150° C. After drying, the washed and dried powder 10 of a lithium composite metal compound (hereinafter, referred to as lithium composite metal compound 11) was obtained.

Evaluation of Lithium Composite Metal Compound 10

Compositional analysis of the obtained lithium composite metal compound 9 was performed, the composition was matched to Composition Formula (I), and it was found that $x=0.00$, $y=0.09$, and $z=0.03$. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Comparative Example 4

Manufacturing of Lithium Composite Metal Compound 11
[Mixing Step]

After the same operations up to the oxide step as in Example 7 were performed to obtain the nickel cobalt aluminum composite oxide 3, the nickel cobalt aluminum composite oxide 2 and lithium hydroxide powder were weighed such that Li/(Ni+Co+Al) reached 1.10 and mixed together.

[Calcining Step]

After that, the mixture obtained in the mixing step was calcined in an oxygen atmosphere at 780° C. for 6 hours to obtain a calcined product 5.

[Washing Step]

After that, the obtained calcined product 5 was washed with pure water to obtain a wet cake 6. The washing step was performed by producing a slurry of the calcined product 5 and pure water at a weight ratio of 1000 g to 3545 g, and then stirring and dehydrating the obtained slurry for 20 minutes.

The obtained wet cake 6 was put into a batch-type dryer and dried in a vacuum for 8 hours under heating at 150° C. After drying, the washed and dried powder 10 of a lithium composite metal compound (hereinafter, referred to as lithium composite metal compound 11) was obtained.

Evaluation of Lithium Composite Metal Compound 11

Compositional analysis of the obtained lithium composite metal compound 9 was performed, the composition was matched to Composition Formula (I), and it was found that $x=0.00$, $y=0.15$, and $z=0.05$. In addition, the amount of lithium carbonate and the amount of lithium hydroxide, which were obtained by neutralization titration, the physical properties of pores, which were obtained by the adsorption and desorption methods of nitrogen, the initial charge and discharge efficiency, and the cycle retention ratio are shown in Table 2.

Figure 2:
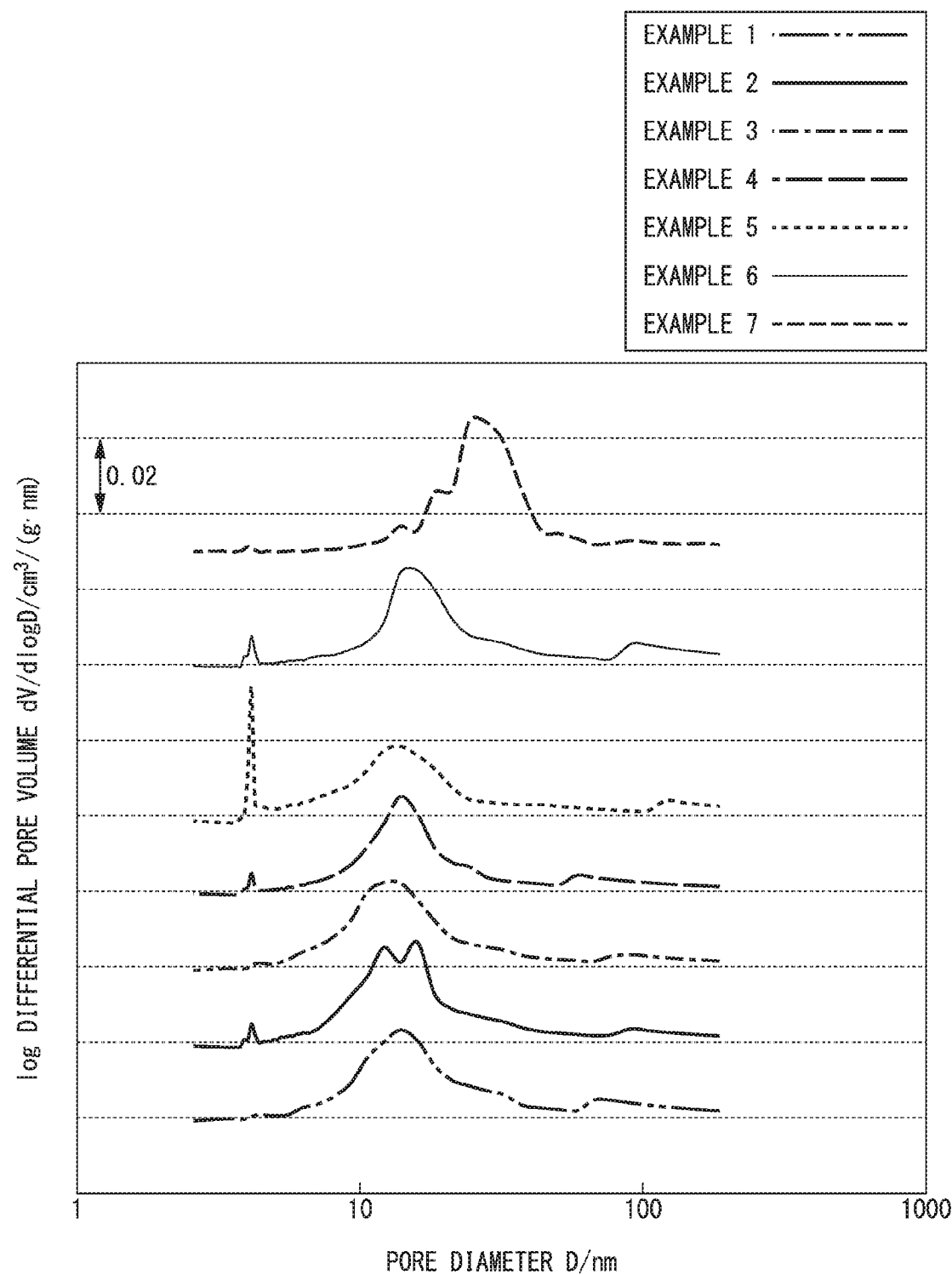
FIG. 2 is graphs of pore distributions expressed as log differential pore volumes obtained by analyzing desorption isotherms for lithium composite metal compounds of Example 1 to Example 7.
Figure 3:
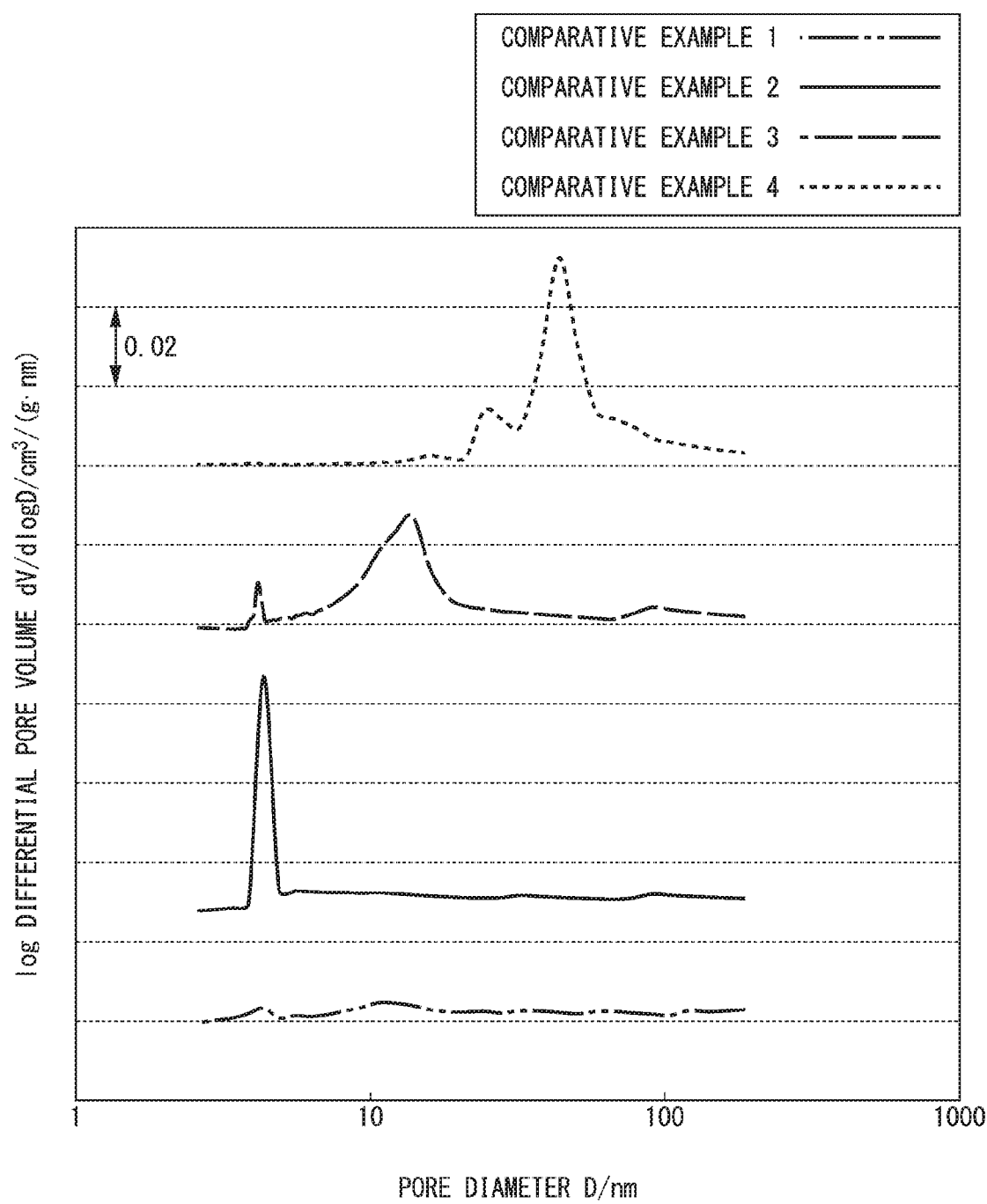
FIG. 3 is graphs of pore distributions expressed as log differential pore volumes obtained by analyzing desorption isotherms for lithium composite metal compounds of Comparative Example 1 to Comparative Example 4.

For Examples 1 to 7 and Comparative Examples 1 to 4, the manufacturing conditions and the results such as the total pore volumes obtained by analyzing the adsorption isotherms, the volume proportions of pores of 15 nm or less that were obtained by analyzing the desorption isotherms, and the cycle retention ratios are collectively shown in Table 1 and Table 2. For Examples 1 to 7 and Comparative Examples 1 to 4, the graphs of the pore distributions expressed as the log differential pore volumes obtained by analyzing the desorption isotherms are shown in FIG. 2 and FIG. 3.

Figure 4:
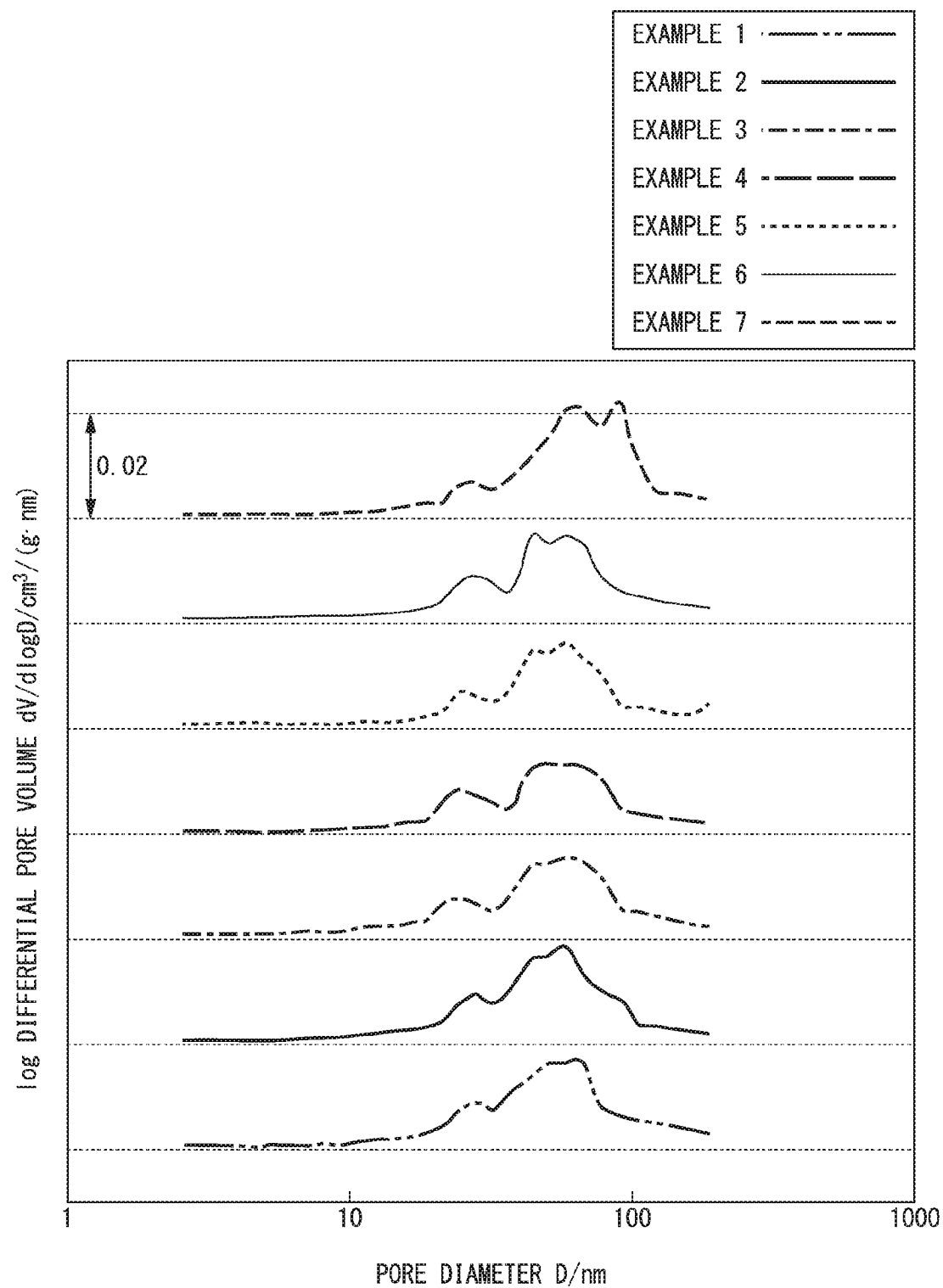
FIG. 4 is graphs of pore distributions expressed as log differential pore volumes obtained by analyzing adsorption isotherms for lithium composite metal compounds of Example 1 to Example 7.
Figure 5:
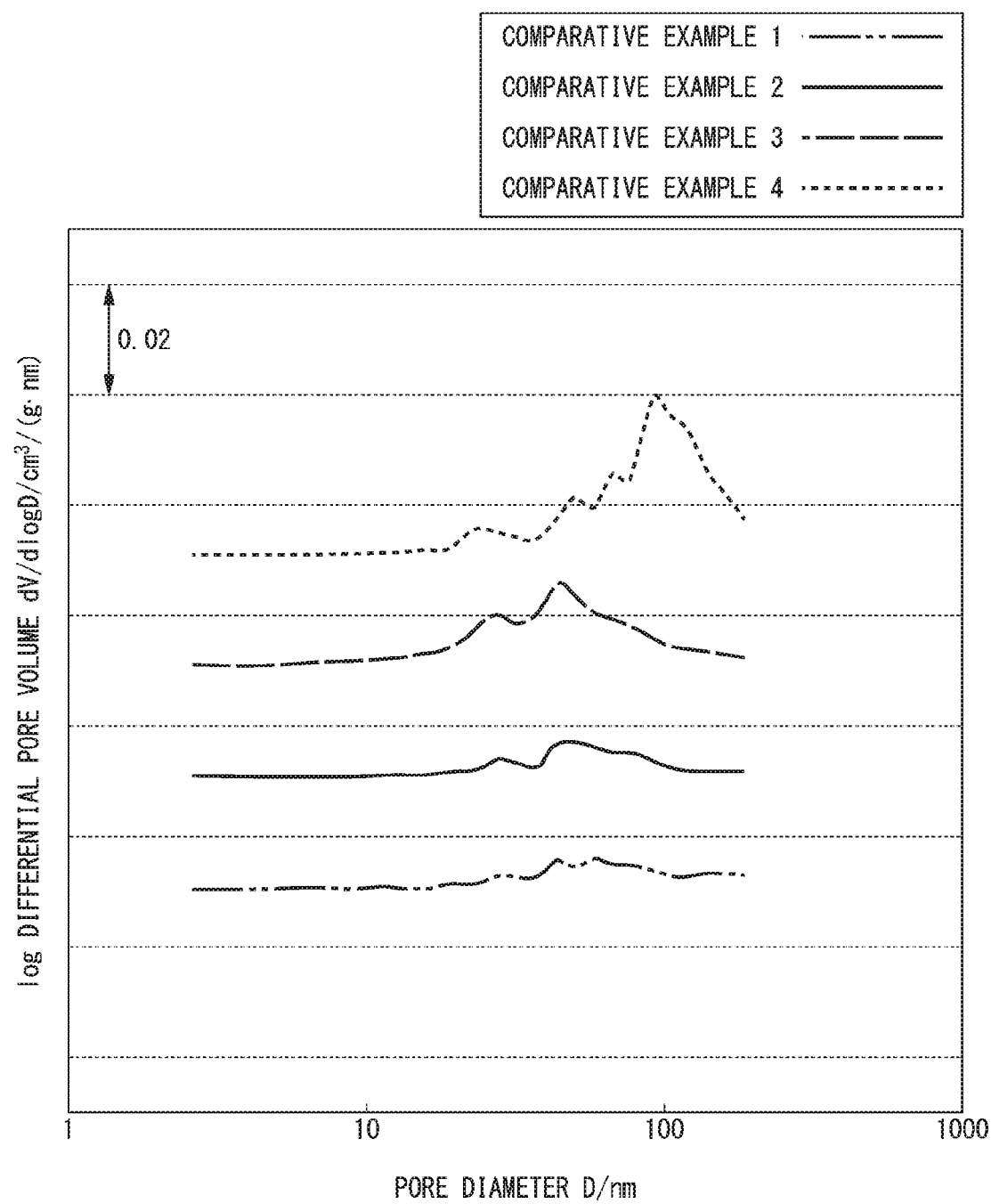
FIG. 5 is graphs of pore distributions expressed as log differential pore volumes obtained by analyzing adsorption isotherms for lithium composite metal compounds of Comparative Example 1 to Comparative Example 4.
Figure 6:
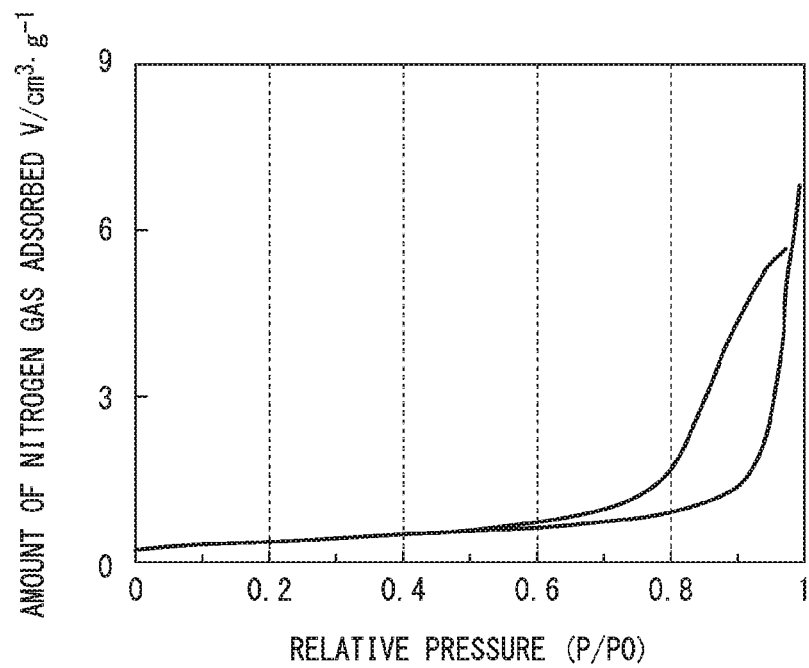
FIG. 6 is a graph illustrating a relationship between an amount of nitrogen gas adsorbed of the lithium composite metal compound of Example 1 and a relative pressure.
Figure 7:
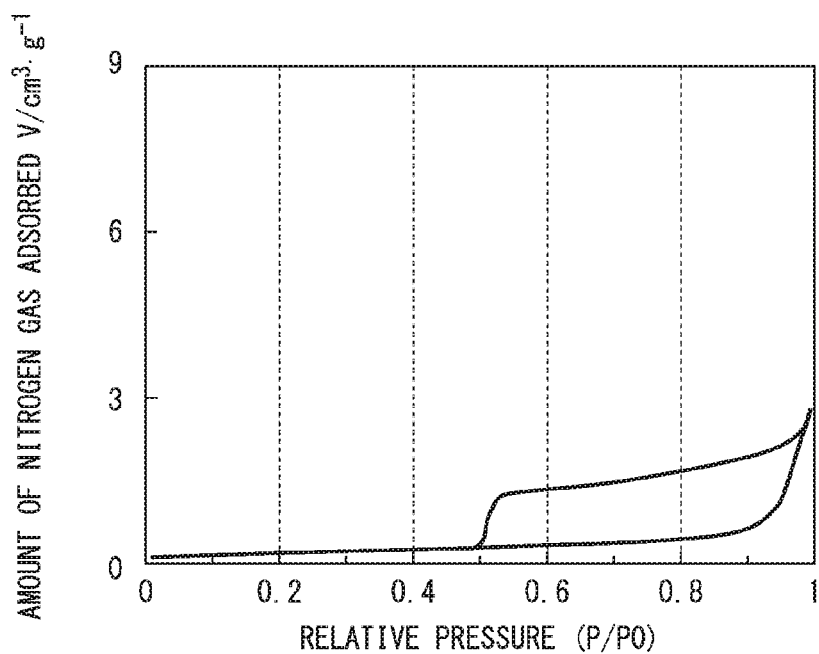
FIG. 7 is a graph illustrating a relationship between an amount of nitrogen gas adsorbed of the lithium composite metal compound of Comparative Example 2 and a relative pressure.

For Examples 1 to 7 and Comparative Examples 1 to 4, the graphs of the pore distributions expressed as the log differential pore volumes obtained by analyzing the adsorption isotherms are shown in FIG. 4 and FIG. 5. A graph showing the relationship between the amount of the nitrogen gas adsorbed of the lithium composite metal compound of Example 1 and the relative pressure is shown in FIG. 6. A graph showing the relationship between the amount of the nitrogen gas adsorbed of the lithium composite metal compound of Comparative Example 2 and the relative pressure is shown in FIG. 7.

Table 2 shows the minimum values (nm) of pore diameters at which the peaks of the log differential pore volumes were observed, S1, S2, and S1/S2 in the pore distributions that were obtained from the adsorption isotherms by the BJH method.

TABLE 1

| | Composition of nickel composite hydroxide | | | Raw material | | |
| --- | --- | --- | --- | --- | --- | --- |
| | Amount of Ni | Amount of Co | Kind and amount of element Mz | mixing molar ratio Li/ (Ni + Co + Mz) | Calcining temperature and calcining time | Washing solution |
| Example 1 | 0.82 | 0.15 | Al, 0.03 | 1.15 | 720° C., 10 hours | Pure water |
| Example 2 | 0.82 | 0.15 | Al, 0.03 | 1.15 | 720° C., 10 hours | Pure water |
| Example 3 | 0.82 | 0.15 | Al, 0.03 | 1.15 | 720° C., 10 hours | Pure water |
| Example 4 | 0.82 | 0.15 | Al, 0.03 | 1.15 | 720° C., 10 hours | Pure water |
| Example 5 | 0.82 | 0.15 | Al, 0.03 | 1.15 | 720° C., 10 hours | Pure water |
| Example 6 | 0.88 | 0.09 | Al, 0.03 | 1.07 | 720° C., 6 hours | Pure water |
| Example 7 | 0.80 | 0.15 | Al, 0.05 | 1.10 | 740° C., 6 hours | Pure water |
| Comparative Example 1 | 0.82 | 0.15 | Al, 0.03 | 1.15 | 720° C., 10 hours | Not washed |
| Comparative Example 2 | 0.82 | 0.15 | Al, 0.03 | 1.15 | 720° C., 10 hours | (First washing) Lithium hydroxide aqueous solution (Second washing) Pure water |
| Comparative Example 3 | 0.88 | 0.09 | Al, 0.03 | 1.05 | 720° C., 6 hours | Pure water |
| Comparative Example 4 | 0.80 | 0.15 | Al, 0.05 | 1.10 | 780° C., 6 hours | Pure water |

| | Drying conditions | | | |
| --- | --- | --- | --- | --- |
| | Drying facility | Temperature and time | Atmosphere | Ratio between aeration rate of supplied gas and moisture evaporation rate in rotary kiln (Nm3/kg) |
| Example 1 | Rotary kiln | 250° C., 2 hr | Nitrogen | 3.0 |
| Example 2 | Rotary kiln | 250° C., 2 hr | Nitrogen | 1.5 |
| Example 3 | Rotary kiln | 250° C., 2 hr | Nitrogen | 6.4 |
| Example 4 | Batch-type dryer | 210° C., 8 hr | Nitrogen (decompressed to 10 kPa) | — |
| Example 5 | Batch-type dryer | 150° C., 8 hr | Vacuum | — |
| Example 6 | Batch-type dryer | 150° C., 8 hr | Vacuum | — |
| Example 7 | Batch-type dryer | 150° C., 8 hr | Vacuum | — |
| Comparative Example 1 | Not dried | — | — | — |
| Comparative Example 2 | Batch-type dryer | 150° C., 8 hr | Vacuum | — |
| Comparative Example 3 | Batch-type dryer | 150° C., 8 hr | Vacuum | — |
| Comparative Example 4 | Batch-type dryer | 150° C., 8 hr | Vacuum | — |

TABLE 2

| | x | y | z | Total pore volume (cm³/g) | Proportions of pores of 15 nm or less (%) | Minimum pore diameter having maximum peak of log differential pore volume (nm) | S1 (cm³/g) | S2 (cm³/g) |
| --- | --- | --- | --- | --- | --- | --- | --- | --- |
| Example 1 | 0.01 | 0.15 | 0.03 | 0.010 | 36 | 28 | 0.227 | 0.246 |
| Example 2 | 0.01 | 0.15 | 0.03 | 0.010 | 41 | 28 | 0.264 | 0.285 |
| Example 3 | 0.01 | 0.15 | 0.03 | 0.010 | 46 | 24 | 0.270 | 0.291 |

TABLE 2-continued

| | | | | | | | | |
|---|---|---|---|---|---|---|---|---|
| Example 4 | 0.01 | 0.15 | 0.03 | 0.0084 | 37 | 24 | 0.195 | 0.214 |
| Example 5 | 0.01 | 0.15 | 0.03 | 0.0085 | 44 | 24 | 0.258 | 0.320 |
| Example 6 | 0.01 | 0.09 | 0.03 | 0.0095 | 24 | 24 | 0.154 | 0.174 |
| Example 7 | 0.00 | 0.15 | 0.05 | 0.012 | 6 | 28 | 0.034 | 0.037 |
| Comparative Example 1 | 0.07 | 0.15 | 0.03 | 0.0040 | 35 | 28 | 0.078 | 0.102 |
| Comparative Example 2 | 0.01 | 0.15 | 0.03 | 0.0041 | 71 | 28 | 0.245 | 0.437 |
| Comparative Example 3 | 0.00 | 0.09 | 0.03 | 0.0091 | 50 | 28 | 0.257 | 0.288 |
| Comparative Example 4 | 0.00 | 0.15 | 0.05 | 0.013 | 3 | 24 | 0.008 | 0.010 |

| | S1/S2 | Peak value of log differential pore volume at 3 to 5 nm ($cm^3/(g \cdot nm)$) | Pore diameter for peak between 10 to 100 nm (nm) | $Li_2CO_3$ (wt %) | LiOH (wt %) | Initial charge and discharge efficiency (%) | Cycle retention ratio (%) |
|---|---|---|---|---|---|---|---|
| Example 1 | 0.92 | No peaks | 14 | 0.14 | 0.10 | 89.2 | 93.2 |
| Example 2 | 0.93 | 0.005 | 16 | 0.26 | 0.09 | 89.4 | 92.0 |
| Example 3 | 0.93 | No peaks | 12 | 0.17 | 0.12 | 89.4 | 93.1 |
| Example 4 | 0.91 | 0.005 | 14 | 0.10 | 0.03 | 89.5 | 92.5 |
| Example 5 | 0.81 | 0.034 | 14 | 0.29 | 0.10 | 89.5 | 92.0 |
| Example 6 | 0.89 | 0.008 | 16 | 0.14 | 0.16 | 88.3 | 90.4 |
| Example 7 | 0.92 | 0.001 | 24 | 0.13 | 0.16 | 90.3 | 92.5 |
| Comparative Example 1 | 0.76 | 0.003 | 11 | 2.36 | 1.10 | 81.1 | 95.7 |
| Comparative Example 2 | 0.56 | 0.057 | No peaks | 0.11 | 0.07 | 89.3 | 88.4 |
| Comparative Example 3 | 0.89 | 0.010 | 14 | 0.12 | 0.15 | 87.9 | 85.0 |
| Comparative Example 4 | 0.80 | No peaks | 44 | 0.12 | 0.17 | 89.3 | 87.7 |

As shown in the above-described results, in Examples 1 to 7 to which the present invention was applied, the initial charge and discharge efficiency and the cycle characteristics improved compared with those in Comparative Examples 1 to 4 to which the present invention was not applied.

Furthermore, in Example 1 and Example 3 to which the manufacturing method to which the present invention was applied was applied, the cycle characteristics improved compared with other examples.

REFERENCE SIGNS LIST

1: Separator
2: Positive electrode
3: Negative electrode
4: Electrode group
5: Battery can
6: Electrolytic solution
7: Top insulator
8: Sealing body
10: Lithium secondary battery
21: Positive electrode lead
31: Negative electrode lead

The invention claimed is:

1. A lithium composite metal compound represented by Composition Formula (I),

$$Li[Li_x(Ni_{(1-y-z)}Co_yMn_z)_{1-x}]O_2 \quad (I)$$

where M represents one or more elements selected from the group consisting of Mn, Fe, Cu, Ti, Mg, Al, W, B, Mo, Zn, Sn, Zr, Ga, Nb, and V, and $-0.10 \le x \le 0.2$, $0 < y \le 0.2$, $0 \le z \le 0.2$, and $0 < y+z \le 0.25$ are satisfied,
wherein physical property values of pores that are obtained from measurement of nitrogen adsorption and desorption isotherms at a liquid nitrogen temperature satisfy requirements (1) and (2),
(1) a total pore volume determined from an amount of nitrogen adsorbed when a relative pressure ($p/p_o$) of an adsorption isotherm is 0.99 is 0.008 $cm^3/g$ or more and 0.012 $cm^3/g$ or less, and
(2) in a pore distribution determined from a desorption isotherm by a BJH method, a proportion of a volume of pores of 15 nm or less with respect to a total pore volume of 200 nm or less is less than 50%, and
wherein, in the pore distribution determined from the desorption isotherm by the BJH method, a minimum value of pore diameters at which a peak of a log differential pore volume is observed is 20 nm or more.

2. The lithium composite metal compound according to claim 1,
wherein a content of lithium carbonate is 0.3 mass % or less, and a content of lithium hydroxide is 0.2 mass % or less.

3. The lithium composite metal compound according to claim 1,
wherein, in the pore distribution determined from the desorption isotherm by the BJH method, a minimum value of pore diameters at which a peak of a log differential pore volume is observed is 10 nm or more.

4. The lithium composite metal compound according to claim 1,
wherein, in a hysteresis loop of the adsorption isotherm and the desorption isotherm that are obtained from the measurement of the nitrogen adsorption and desorption isotherms,
in a case where an area between the adsorption isotherm and the desorption isotherm at the relative pressures ($p/p_o$) in a range of 0.7 or more and 0.9 or less is denoted by S1, and an area between the adsorption isotherm and the desorption isotherm at the relative pressures ($p/p_o$) in a range of 0.5 or more and 0.9 or less is denoted by S2, a ratio (S1/S2) of the S1 to the S2 is 0.8 or more.

5. The lithium composite metal compound according to claim 1,
wherein, in the pore distribution determined from the desorption isotherm by the BJH method,
a peak of a log differential pore volume is present at a pore diameter in a range of 10 nm or more and 40 nm or less.

6. The lithium composite metal compound according to claim 1,
wherein, in the pore distribution determined from the desorption isotherm by the BJH method, a peak value of a log differential pore volume at a pore diameter in a range of 3 nm or more and 5 nm or less is less than 0.005 cm$^3$/(g·nm).

7. The lithium composite metal compound according to claim 1,
wherein, in the pore distribution determined from the desorption isotherm by the BJH method, a peak value of a log differential pore volume is not present at a pore diameter in a range of 3 nm or more and 5 nm or less.

8. A positive electrode active material for a lithium secondary battery, comprising:
the lithium composite metal compound according to claim 1.

9. A positive electrode for a lithium secondary battery, comprising:
the positive electrode active material for a lithium secondary battery according to claim 8.

10. A lithium secondary battery comprising:
the positive electrode for a lithium secondary battery according to claim 9.

11. A method for manufacturing a lithium composite metal compound represented by Composition Formula (I), the method comprising:

$$Li[Li_x(Ni_{(1-y-z)}Co_yMn_z)_{1-x}]O_2 \qquad (I)$$

where M represents one or more elements selected from the group consisting of Mn, Fe, Cu, Ti, Mg, Al, W, B, Mo, Zn, Sn, Zr, Ga, Nb, and V, and $-0.10 \leq x \leq 0.2$, $0 < y \leq 0.2$, $0 \leq z \leq 0.2$, and $0 < y+z \leq 0.25$ are satisfied,
a step of calcining a mixture of a lithium compound and a transition metal compound to obtain a lithium composite metal compound;
a water washing step of removing the lithium compound remaining in the lithium composite metal compound by water washing; and
a step of drying the water-washed lithium composite metal compound,
wherein the drying step is performed in a rotary kiln supplied with a gas having a carbon dioxide concentration of 300 ppm or less, the water-washed lithium composite metal compound is heated at a temperature of 150° C. or higher and 300° C. or lower in the rotary kiln, and a ratio (B/A) of an aeration rate B (Nm$^3$/hour) of a gas that is supplied from an outside to a moisture evaporation rate A (kg/hour) during drying is 2 Nm$^3$/kg or more and 20 Nm$^3$/kg or less, and
wherein, the aeration rate B is the aeration rate of the gas with a carbon dioxide concentration of 300 ppm or less.

* * * * *